United States Patent
Saori

(10) Patent No.: US 7,248,416 B2
(45) Date of Patent: Jul. 24, 2007

(54) WIDE-ANGLE ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/427,100

(22) Filed: Jun. 28, 2006

(65) Prior Publication Data
US 2007/0002458 A1 Jan. 4, 2007

(30) Foreign Application Priority Data
Jun. 29, 2005 (JP) ............................. 2005-190541

(51) Int. Cl.
G02B 15/14 (2006.01)
G02B 9/34 (2006.01)

(52) U.S. Cl. ...................... 359/680; 359/686; 359/771; 359/781

(58) Field of Classification Search ........ 359/680–683, 359/686, 687, 676, 677, 771, 781
See application file for complete search history.

(56) References Cited

U.S. PATENT DOCUMENTS

| | | | |
|---|---|---|---|
| 5,276,553 A | 1/1994 | Tatsuno | |
| 5,710,669 A | 1/1998 | Endo | |
| 5,805,351 A | 9/1998 | Hayashi | |
| 6,809,880 B2 * | 10/2004 | Murata | 359/686 |
| 6,885,506 B2 * | 4/2005 | Yoneyama | 359/682 |
| 6,924,947 B2 | 8/2005 | Saori | |
| 7,016,119 B2 | 3/2006 | Saori | |
| 7,106,520 B2 | 9/2006 | Saori | |
| 7,110,185 B2 | 9/2006 | Saori | |
| 2006/0056063 A1 | 3/2006 | Saori et al. | |

FOREIGN PATENT DOCUMENTS

| | | |
|---|---|---|
| JP | 10-082954 | 3/1998 |
| JP | 10-325923 | 12/1998 |
| JP | 11-174328 | 7/1999 |
| JP | 2001-083421 | 3/2001 |
| JP | 2001-318314 | 11/2001 |

(Continued)

OTHER PUBLICATIONS

English language Abstract of JP 10-082954.

(Continued)

*Primary Examiner*—Loha Ben
(74) *Attorney, Agent, or Firm*—Greenblum & Bernstein, P.L.C.

(57) ABSTRACT

A wide-angle zoom lens system includes a negative first lens group, a positive second lens group, a negative third lens group and a positive fourth lens group), in this order from the object.

Upon zooming from the short focal length extremity to the long focal length extremity, a distance between the negative first lens group and the positive second lens group decreases, a distance between the positive second lens group and the negative third lens group increases, and a distance between the negative third lens group and the positive fourth lens group decreases.

The wide-angle zoom lens system satisfies the following conditions:

$$1.3 < |f1|/fw < 1.7 \ (f1 < 0) \qquad (1)$$

$$2.5 < f4/fw < 3.3 \qquad (2)$$

wherein
  $f1$ designates the focal length of the negative first lens group;
  $f4$ designates the focal length of the positive fourth lens group; and
  $fw$ designates the focal length of the entire wide-angle zoom lens system at the short focal length extremity.

19 Claims, 13 Drawing Sheets

FOREIGN PATENT DOCUMENTS

| | | |
|---|---|---|
| JP | 2002-287031 | 10/2002 |
| JP | 2004-061910 | 2/2004 |
| JP | 2004-240038 | 8/2004 |

OTHER PUBLICATIONS

English language Abstract of JP 10-325923.
English language Abstract of JP 2001-083421.
English language Abstarct of JP 2001-318314.
English language Abstract of JP 2002-287031.
English language Abstract of JP 2004-061910.
English language Abstract of JP 2004- 240038.
U.S. Appl. No. 11/427,046 to Saori, which was filed on Jun. 28, 2006.
U.S. Appl. No. 11/427,075 to Saori, which was filed on Jun. 28, 2006.
U.S. Appl. No. 11/427,127 to Saori, which was filed on Jun. 28, 2006.

\* cited by examiner

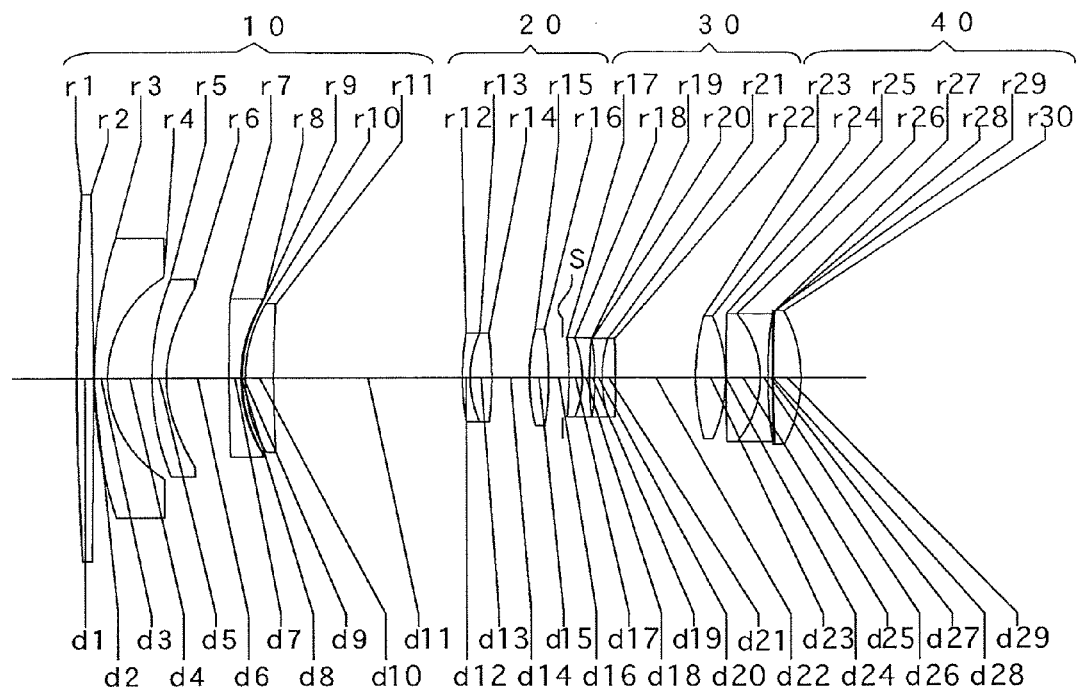
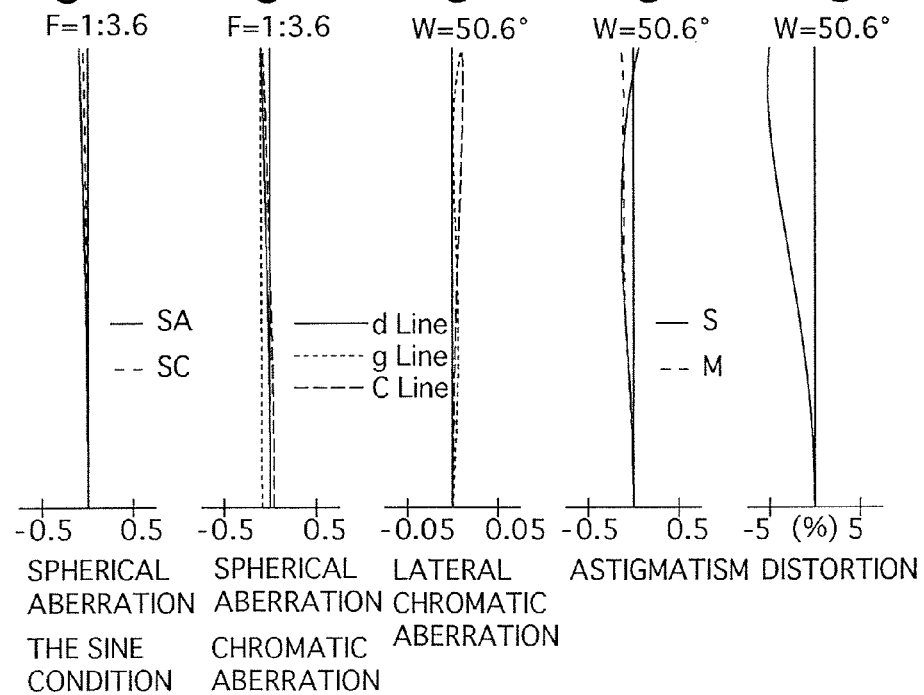

Fig. 11
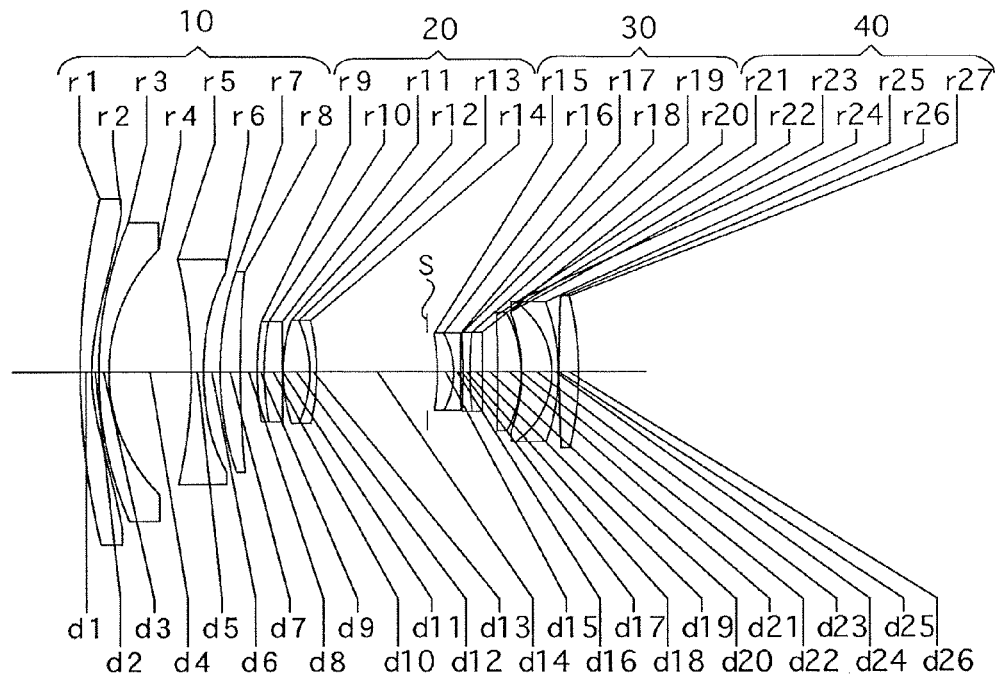
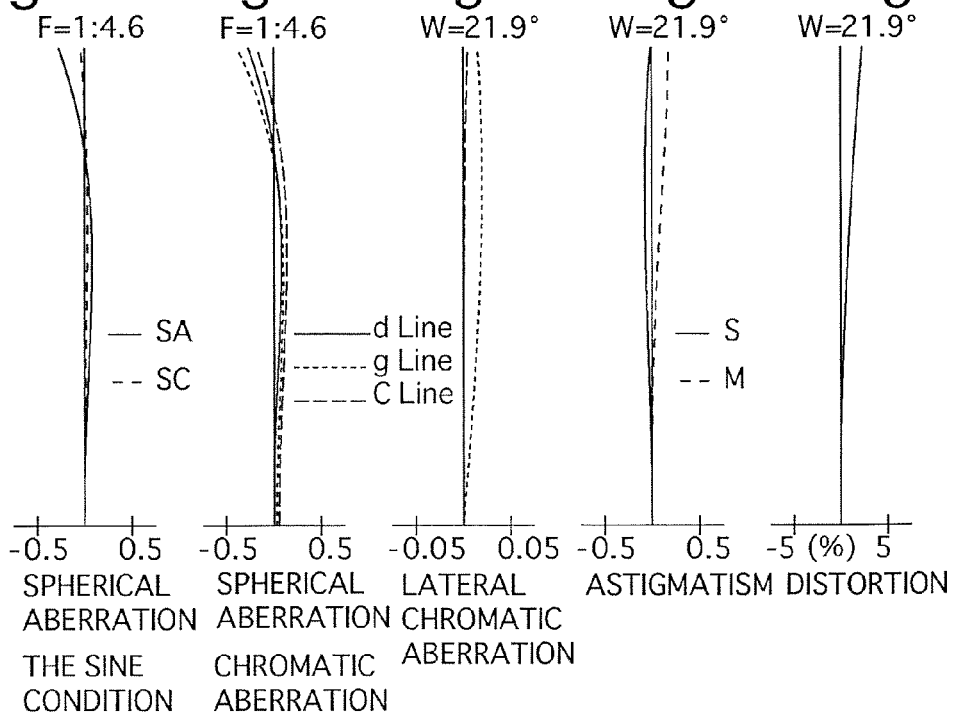
Fig.12A    Fig.12B    Fig.12C    Fig.12D    Fig.12E
F=1:4.6    F=1:4.6    W=21.9°    W=21.9°    W=21.9°
— SA          — d Line              — S
-- SC         ······ g Line         -- M
              ---- C Line
-0.5  0.5   -0.5  0.5   -0.05  0.05   -0.5  0.5   -5 (%) 5
SPHERICAL   SPHERICAL   LATERAL      ASTIGMATISM  DISTORTION
ABERRATION  ABERRATION  CHROMATIC
THE SINE    CHROMATIC   ABERRATION
CONDITION   ABERRATION Fig. 15
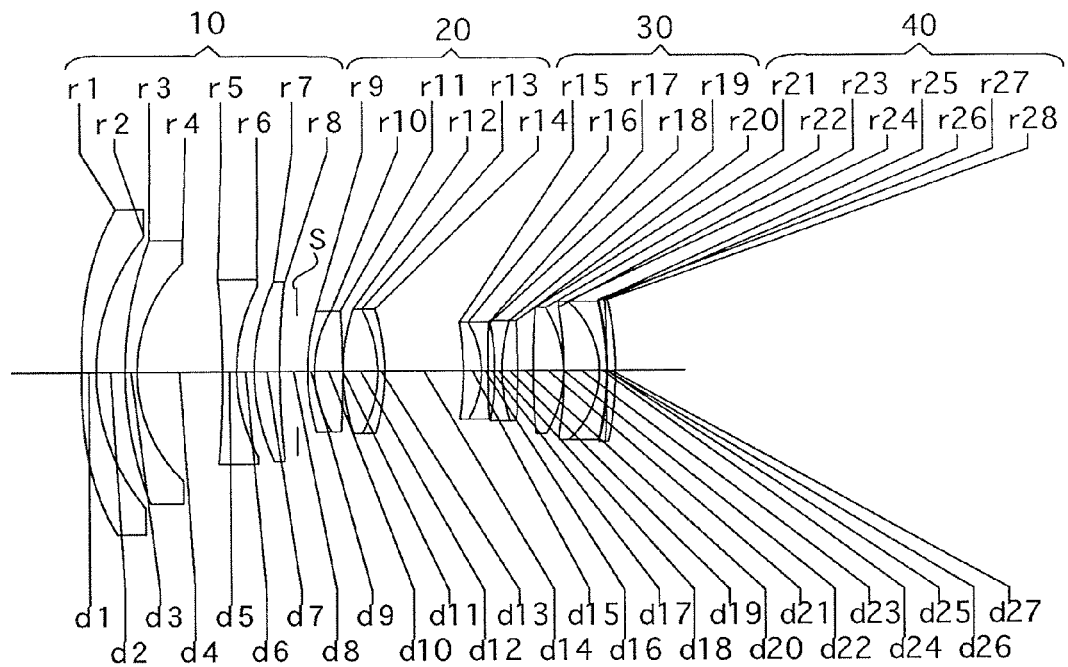
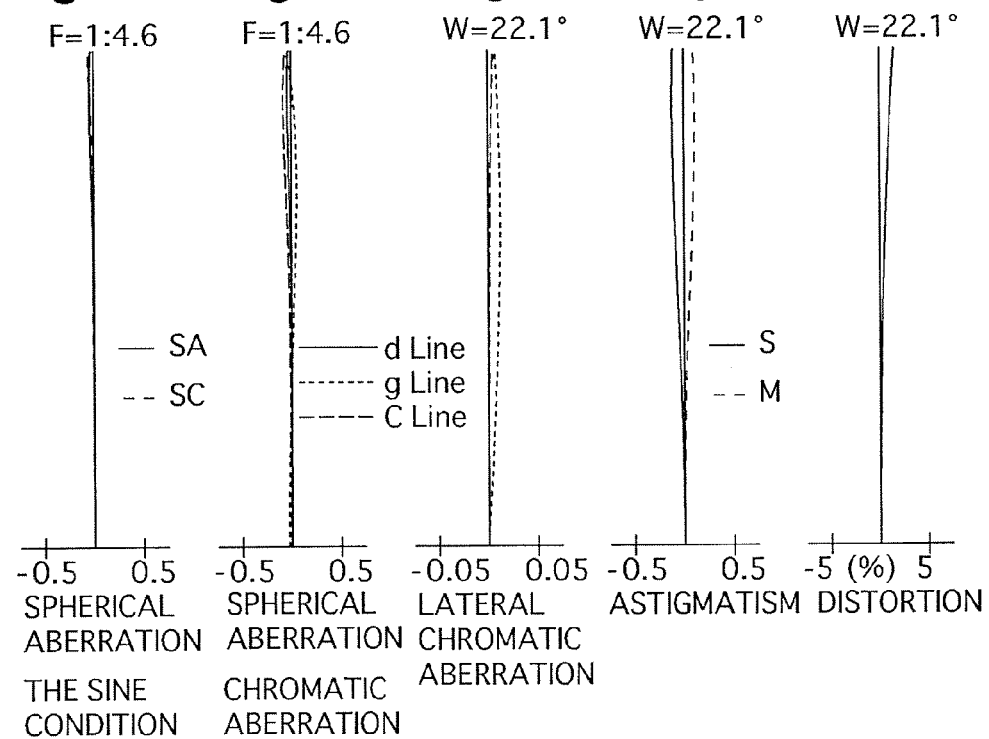
Fig.16A  Fig.16B  Fig.16C  Fig.16D  Fig.16E

Fig. 19
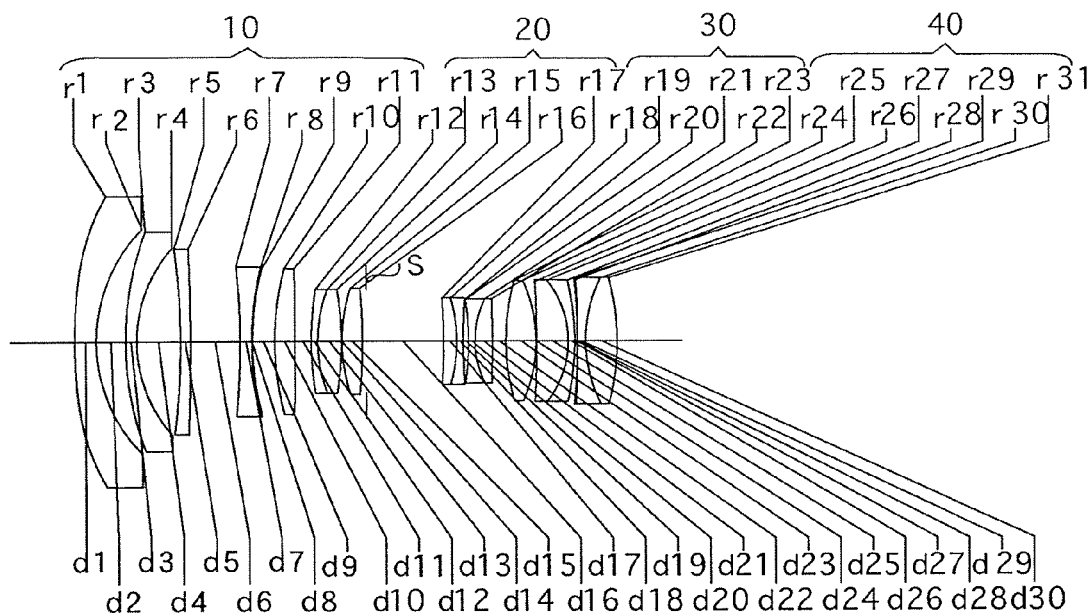
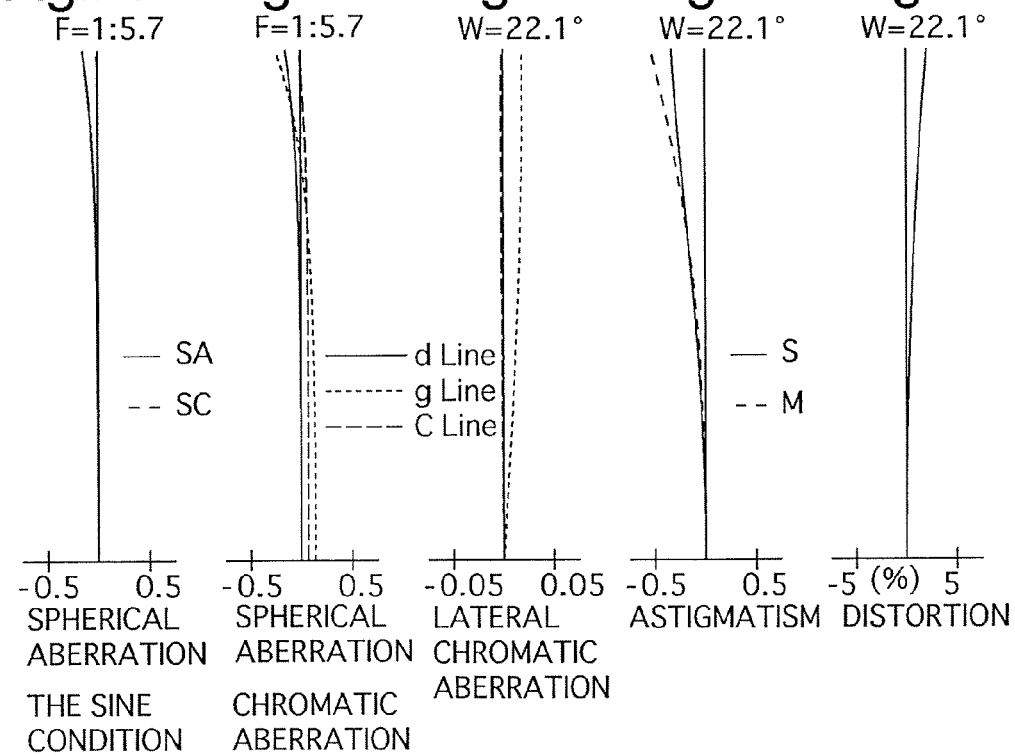

Fig. 21
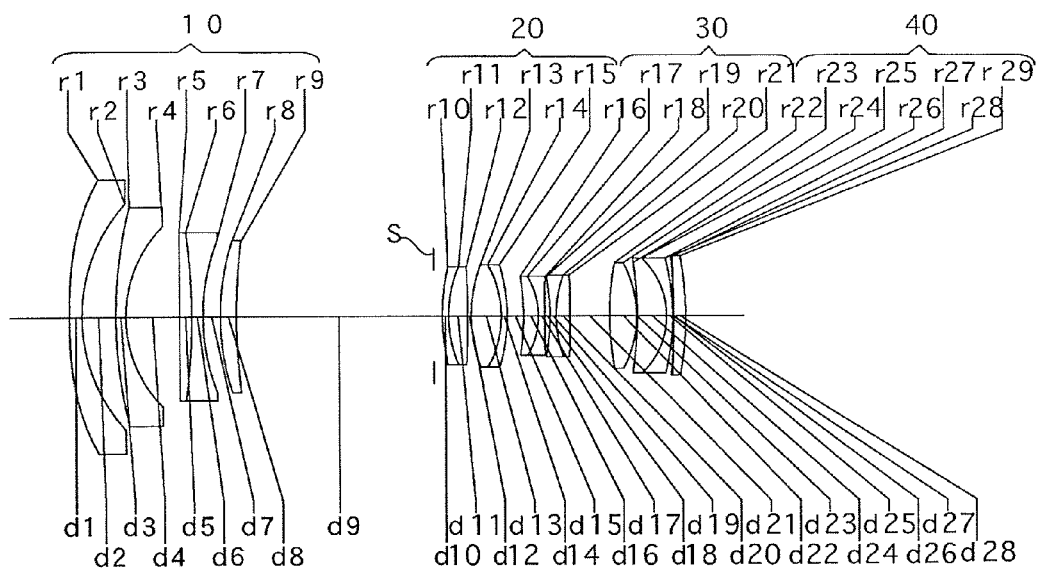
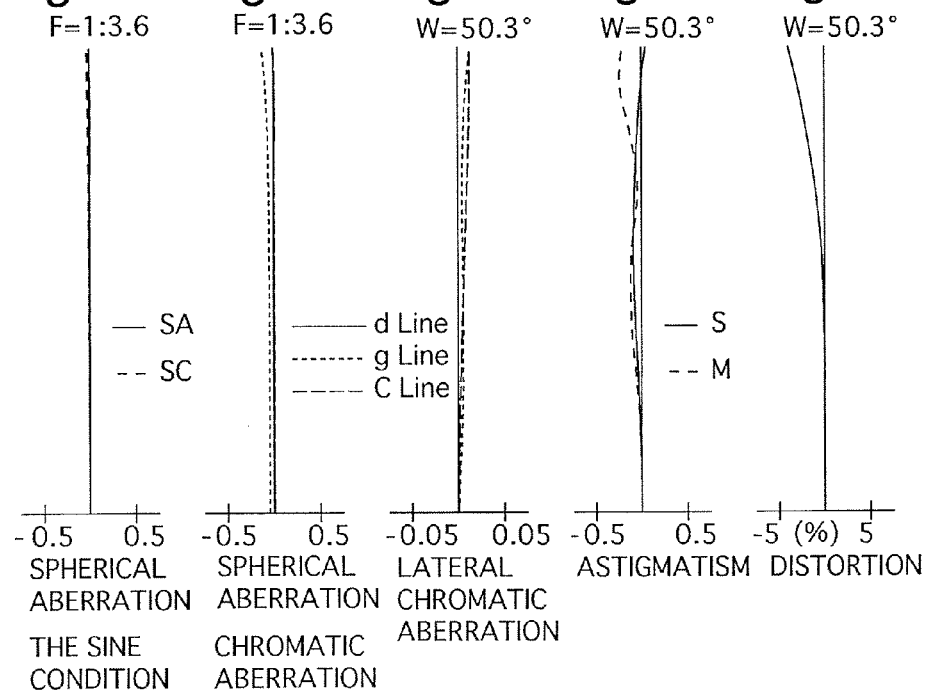
Fig.22A  Fig.22B  Fig.22C  Fig.22D  Fig.22E
F=1:3.6   F=1:3.6   W=50.3°   W=50.3°   W=50.3°
— SA       —— d Line       — S
-- SC      ······ g Line    -- M
           ----- C Line
-0.5  0.5   -0.5  0.5   -0.05  0.05   -0.5  0.5   -5 (%) 5
SPHERICAL   SPHERICAL   LATERAL        ASTIGMATISM  DISTORTION
ABERRATION  ABERRATION  CHROMATIC
THE SINE    CHROMATIC   ABERRATION
CONDITION   ABERRATION Fig. 23
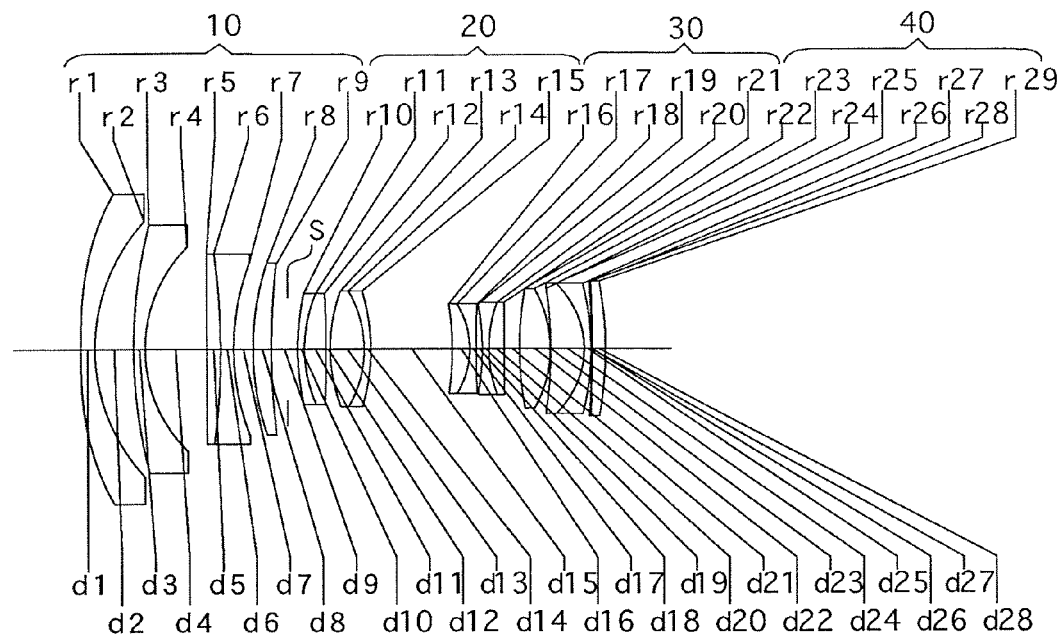
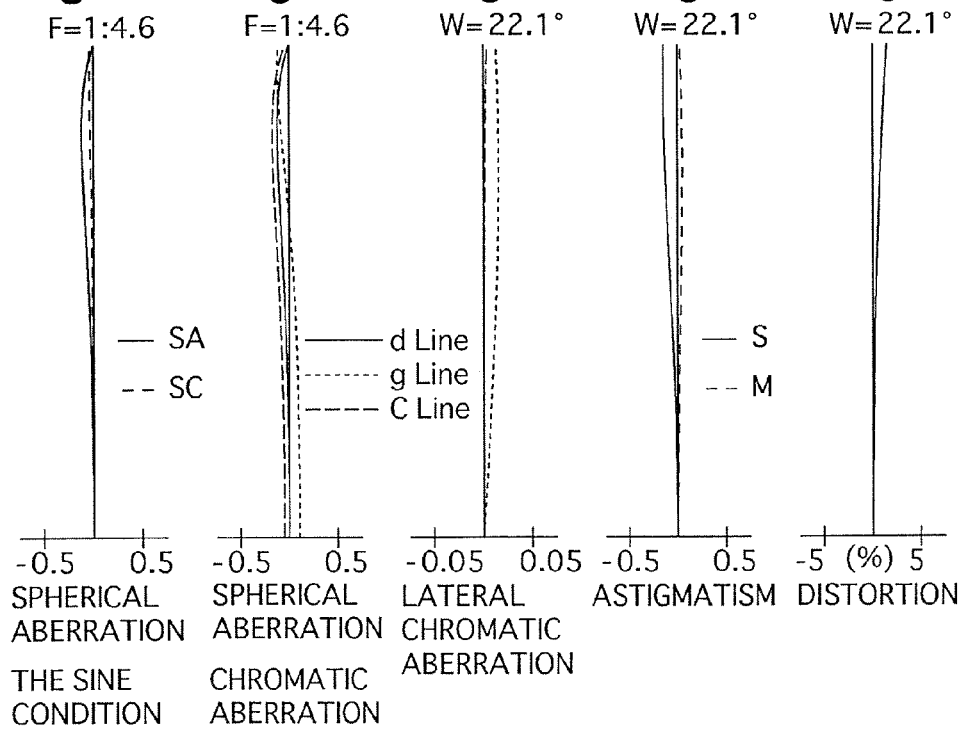
Fig.24A   Fig.24B   Fig.24C   Fig.24D   Fig.24E

WIDE-ANGLE ZOOM LENS SYSTEM

BACKGROUND OF THE INVENTION

1. Field of the Invention

The present invention relates to a wide-angle zoom lens system which is suitable for a single-lens reflex (SLR) camera, and especially suitable for a digital single-lens reflex camera.

2. Description of the Prior Art

In a digital SLR camera, the size of the imaging device is smaller than a frame size of the film for a silver-halide SLR camera. Therefore an optical system having a wider angle-of-view (shorter focal length) is necessary.

For example, a zoom lens system of a two-lens-group arrangement (e.g., negative and positive lens groups) has been commonly used; or a zoom lens system of a four-lens-group arrangement (e.g., negative, positive, negative and positive lens groups) has also been commonly used. Zoom lens systems of these types have been disclosed in Japanese Unexamined Patent Publication (hereinafter, JUPP) No. H10-325923, JUPP No. H11-174328, JUPP No. 2004-240038, and JUPP No. 2002-287031.

The majority of conventional wide-angle zoom lens systems have a zoom ratio of approximately 2. Even in the case where a zoom lens system has a zoom ratio of more than 2, a wide-angle zoom lens system, used with an imaging device having a smaller image plane like that of APSC size image sensors, has not been known to have an angle-of-view of more than 100 degrees.

In JUPP No. H10-325923, the wide-angle zoom lens system has a sufficient angle-of-view of closer to 100 degrees; however, the zoom ratio is less than 2.

In JUPP No. 11-174328, the wide-angle zoom lens system has a zoom ratio of approximately 2.8; however, a sufficient angle-of-view cannot be achieved.

In JUPP No. 2004-240038 and JUPP No. 2002-287031, the wide-angle zoom lens systems have the zoom ratio is approximately 2.2, i.e., substantially equal to 2, and the angle-of-view is insufficient.

SUMMARY OF THE INVENTION

The present invention achieves a wide-angle zoom lens system which is suitable for a digital SLR camera having a smaller imaging device, has a wide angle-of-view of approximately 100 degrees at the short focal length extremity, and has a zoom ratio of approximately 2.5 to 3.0.

According to an aspect of the present invention, there is provided a wide-angle zoom lens system including a first lens group having a negative refractive power (hereinafter, a negative first lens group), a second lens group having a positive refractive power (hereinafter, a positive second lens group), a third lens group having a negative refractive power (hereinafter, a negative third lens group) and a fourth lens group having a positive refractive power (hereinafter, a positive fourth lens group), in this order from the object.

Upon zooming from the short focal length extremity to the long focal length extremity, a distance between the negative first lens group and the positive second lens group decreases, a distance between the positive second lens group and the negative third lens group increases, and a distance between the negative third lens group and the positive fourth lens group decreases.

The wide-angle zoom lens system satisfies the following conditions:

$$1.3 < |f1|/fw < 1.7 \ (f1 < 0) \quad (1)$$

$$2.5 < f4/fw < 3.3 \quad (2)$$

wherein f1 designates the focal length of the negative first lens group;
f4 designates the focal length of the positive fourth lens group; and
fw designates the focal length of the entire wide-angle zoom lens system at the short focal length extremity.

The wide-angle zoom lens system preferably satisfies the following condition:

$$0.6 < f2/ft < 0.8 \quad (3)$$

wherein f2 designates the focal length of the positive second lens group; and
ft designates the focal length of the entire wide-angle zoom lens system at the long focal length extremity.

The wide-angle zoom lens system preferably satisfies the following condition:

$$0.4 < |f3|/ft < 0.9 \ (f3 < 0) \quad (4)$$

wherein f3 designates the focal length of the negative third lens group; and
ft designates the focal length of the entire wide-angle zoom lens system at the long focal length extremity.

According to another aspect of the present invention, there is provided a wide-angle zoom lens system including a negative first lens group, a positive second lens group, a negative third lens group and a positive fourth lens group, in this order from the object.

Upon zooming from the short focal length extremity to the long focal length extremity, a distance between the negative first lens group and the positive second lens group decreases, a distance between the positive second lens group and the negative third lens group increases, and a distance between the negative third lens group and the positive fourth lens group decreases.

The wide-angle zoom lens system satisfies the following conditions:

$$0.6 < f2/ft < 0.8 \quad (3)$$

$$0.4 < |f3|/ft < 0.9 \ (f3 < 0) \quad (4)$$

wherein f2 designates the focal length of the positive second lens group;
f3 designates the focal length of the negative third lens group; and
ft designates the focal length of the entire wide-angle zoom lens system at the long focal length extremity.

The wide-angle zoom lens system preferably satisfies the following condition:

$$2.5 < f4/fw < 3.3 \quad (2)$$

wherein f4 designates the focal length of the positive fourth lens group; and
fw designates the focal length of the entire wide-angle zoom lens system at the short focal length extremity.

The wide-angle zoom lens system preferably satisfies the following conditions:

$$1.2 < f2/|f1| < 1.6 \quad (f1<0) \qquad (5)$$

$$1.0 < f4/|f3| < 1.6 \quad (f3<0) \qquad (6)$$

wherein f1 designates the focal length of the negative first lens group;

f2 designates the focal length of the positive second lens group;

f3 designates the focal length of the negative third lens group; and f4 designates the focal length of the positive fourth lens group.

According to further aspect of the present invention, there is provided a wide-angle zoom lens system including a negative first lens group, a positive second lens group, a negative third lens group and a positive fourth lens group, in this order from the object.

Upon zooming from the short focal length extremity to the long focal length extremity, a distance between the negative first lens group and the positive second lens group decreases, a distance between the positive second lens group and the negative third lens group increases, and a distance between the negative third lens group and the positive fourth lens group decreases.

The wide-angle zoom lens system satisfies the following conditions:

$$1.2 < f2/|f1| < 1.6 \quad (f1<0) \qquad (5)$$

$$1.0 < f4/|f3| < 1.6 \quad (f3<0) \qquad (6)$$

wherein f1 designates the focal length of the negative first lens group;

f2 designates the focal length of the positive second lens group;

f3 designates the focal length of the negative third lens group; and f4 designates the focal length of the positive fourth lens group.

The negative first lens group preferably includes, at least, a negative meniscus lens element having the convex surface facing toward the object, another negative meniscus lens element having the convex surface facing toward the object, a negative lens element having a concave surface facing toward the image, and a positive lens element, in this order from the object.

The positive second lens group preferably includes positive cemented lens elements and a positive lens element, or two sets of positive cemented lens elements.

The negative third lens group preferably includes two sets of negative cemented lens elements.

The positive fourth lens group preferably includes cemented lens elements and two positive lens elements, or two sets of cemented lens elements and a positive lens element.

The present disclosure relates to subject matter contained in Japanese Patent Application No. 2005-190541 (filed on Jun. 29, 2005) which is expressly incorporated herein in its entirety.

BRIEF DESCRIPTION OF THE DRAWINGS

The present invention will be discussed below in detail with reference to the accompanying drawings, in which:

FIG. 5 is a lens arrangement of the wide-angle zoom lens system, at the short focal length extremity, according to a second embodiment of the present invention;

FIGS. 6A, 6B, 6C, 6D and 6E show aberrations occurred in the lens arrangement shown in FIG. 5;

FIG. 11 is a lens arrangement of the wide-angle zoom lens system, at the long focal length extremity, according to the third embodiment of the present invention;

FIGS. 12A, 12B, 12C, 12D and 12E show aberrations occurred in the lens arrangement shown in FIG. 11;

FIGS. 14A, 14B, 14, 14D and 14E show aberrations occurred in the lens arrangement shown in FIG. 13;

FIG. 15 is a lens arrangement of the wide-angle zoom lens system, at the long focal length extremity, according to the fourth embodiment of the present invention;

FIGS. 16A, 16B, 16C, 16D and 16E show aberrations occurred in the lens arrangement shown in FIG. 15;

FIG. 19 is a lens arrangement of the wide-angle zoom lens system, at the long focal length extremity, according to the fifth embodiment of the present invention;

FIGS. 20A, 20B, 20C, 20D and 20E show aberrations occurred in the lens arrangement shown in FIG. 19;

FIG. 21 is a lens arrangement of the wide-angle zoom lens system, at the short focal length extremity, according to a sixth embodiment of the present invention;

FIGS. 22A, 22B, 22C, 22D and 22E show aberrations occurred in the lens arrangement shown in FIG. 21;

FIG. 23 is a lens arrangement of the wide-angle zoom lens system, at the long focal length extremity, according to the sixth embodiment of the present invention;

FIGS. 24A, 24B, 24C, 24D and 24E show aberrations occurred in the lens arrangement shown in FIG. 23.

DESCRIPTION OF THE PREFERRED EMBODIMENTS

Figure 25:
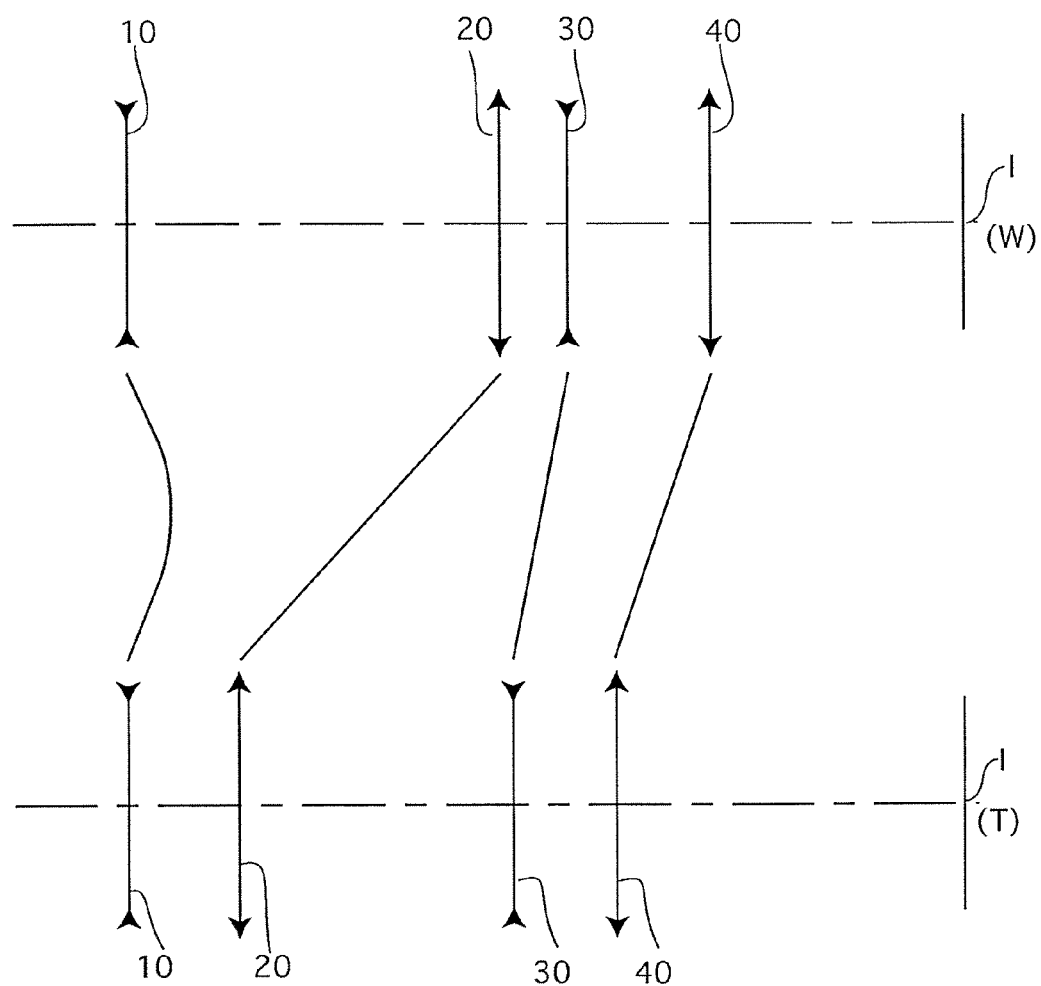
FIG. 25 is the schematic view of the lens-group moving paths for the wide-angle zoom lens system according to the present invention.

The wide-angle zoom lens system of the present invention, as shown in the zoom path of FIG. 25, includes a negative first lens group 10, a positive second lens group 20, a negative third lens group 30, and a positive fourth lens group 40, in this order from the object.

Upon zooming from the short focal length extremity (W) to the long focal length extremity (T), the negative first lens group 10 first moves toward the image and thereafter and moves toward the object; the positive second lens group 20, the negative third lens group 30 and the positive fourth lens group 40 move monotonically toward the object.

While the zooming is being performed, the distance between the negative first lens group 10 and the positive second lens group 20 first decreases largely, and thereafter gradually decreases; the distance between the positive second lens group 20 and the negative third lens group 30 monotonically increases; the distance between the negative third lens group 30 and the positive fourth lens group 40 monotonically decreases; and the distance between the positive fourth lens group 40 and the image plane monotonically increases.

A diaphragm S is arranged to move together with the positive second lens group 20 or the negative third lens group 30.

Condition (1) specifies the ratio of the focal length of the negative first lens group 10 to the focal length of the entire wide-angle zoom lens system at the short focal length extremity.

If the negative power of the negative first lens group 10 becomes weaker to the extent that |f1|/fw exceeds the upper limit of condition (1), the negative power of the negative third lens group 30 has to be made stronger to attain a predetermined back focal distance. Consequently, spherical aberration and coma are overcorrected.

If the negative power of the negative first lens group 10 become stronger to the extent that |f1|/fw exceeds the lower limit of condition (1), distortion and astigmatism become larger at the short focal length extremity; and the correcting distortion and astigmatism becomes difficult. Moreover, a suitable telephoto state cannot be attained at the long focal length extremity. Accordingly, the positive second lens group 20 is required to have a stronger positive power in order to make the overall length of the wide-angle zoom lens system shorter at the long focal length extremity; and spherical aberration occurs largely at the long focal length extremity to the extent that the correcting of spherical aberration becomes difficult.

Condition (2) specifies the ratio of the focal length of the positive fourth lens group 40 to the focal length of the entire wide-angle zoom lens system at the short focal length extremity.

If the positive power of the positive fourth lens group 40 becomes weaker to the extent that f4/fw exceeds the upper limit of condition (2), the correcting of distortion cannot be made sufficiently.

If the positive power of the positive fourth lens group 40 becomes stronger to the extent that f4/fw exceeds the lower limit of condition (4),spherical aberration and coma largely occur to the extent that the correcting thereof becomes difficult; and the correcting of lateral chromatic aberration at the short focal length extremity cannot be made suitably.

Condition (3) specifies the ratio of the focal length of the positive second lens group 20 to the focal length of the entire wide-angle zoom lens system at the long focal length extremity.

If the positive power of the positive second lens group 20 becomes weaker to the extent that f2/ft exceeds the upper limit of condition (3), the positive fourth lens group 40 is required to have a stronger positive power in order to attain a desired focal length; and in this case, the correcting of lateral chromatic aberration at short focal length extremity cannot be made suitably.

If the positive power of the positive second lens group 20 becomes stronger to the extent that f2/ft exceeds the lower limit of condition (3), spherical aberration and coma largely occur at the long focal length extremity in particular.

Condition (4) specifies the ratio of the focal length of the negative third lens group 30 to the focal length of the entire wide-angle zoom lens system at the long focal length extremity.

If the negative power of the negative third lens group 30 becomes weaker to the extent that |f3|/ft exceeds the upper limit of condition (4), the traveling distance of the negative third lens group 30 upon zooming becomes longer; and field curvature and spherical aberration over the entire zooming range are undercorrected.

If the negative power of the negative third lens group 30 becomes stronger to the extent that |f3|/ft exceeds the lower limit of condition (4), spherical aberration, coma and astigmatism, etc. are overcorrected.

Condition (5) specifies the ratio of the focal length of the positive second lens group 20 to that of the negative first lens group 10.

If f2/|f1| exceeds the upper limit of condition (5), the power of the negative first lens group 10 becomes too strong. Consequently, the correcting of distortion and astigmatism at the short focal length extremity cannot be made adequately.

If f2/|f1| exceeds the lower limit of condition (5), the power of the positive second lens group 20 becomes too strong. Consequently, the correcting of spherical aberration and coma becomes difficult at the long focal length extremity in particular.

Condition (6) specifies the ratio of the focal length of the positive fourth lens group 40 to that of the negative third lens group 30.

If f4/|f3| exceeds the upper limit of condition (6), the power of the negative third lens group 30 becomes too strong. Consequently, spherical aberration and coma are overcorrected at the long focal length extremity in particular.

If f4/|f3| exceeds the lower limit of condition (6), the power of the positive fourth lens group 40 becomes too strong. Consequently, the correcting of coma at the long focal length extremity and the correcting of distortion at the short focal length extremity cannot be made suitably.

The negative first lens group 10 can include a (first) negative meniscus lens element having the convex surface facing toward the object, another (second) negative meniscus lens element having the convex surface facing toward the object, a negative lens element having a concave surface facing toward the image, and a positive lens element, in this order from the object.

Furthermore, the negative first lens group 10 can include a (first) negative meniscus lens element having the convex surface facing toward the object, another (second) negative meniscus lens element having the convex surface facing toward the object, a positive lens element, a negative lens element having a concave surface facing toward the image, and another positive lens element, in this order from the object.

Still further, the negative first lens group 10 can include a (first) negative meniscus lens element having the convex surface facing toward the object, another (second) negative meniscus lens element having the convex surface facing toward the object, a positive lens element and a negative lens element which are cemented, and a positive lens element, in this order from the object.

In the negative first lens group 10, an aspherical surface is formed on the most object-side lens element (i.e., the (first) negative meniscus lens element having the convex surface facing toward the object). Due to this arrangement, the correcting of distortion and astigmatism occurred in the wide-angle zoom lens system can be made suitably. The aspherical surface is formed so that the negative power becomes weaker toward the periphery of the lens element. In the case where the aspherical surface is formed on the object-side surface of the most object-side lens element in the negative first lens group 10, the correcting of distortion in particular can be made suitably.

On the other hand, in the case where the aspherical surface is formed on the image-side surface of the most object-side lens element in the negative first lens group 10, the thickness (the distance from the center on the object-side surface to the peripheral edge of the image-side thereof) of the most object-side lens element can be made thinner.

In the negative first lens group 10, a positive lens element can be provided on the object side of the (first) meniscus lens element. The positive lens element is preferably a biconvex positive lens element.

In other words, the negative first lens group 10 can include a biconvex positive lens element, a (first) negative meniscus lens element having the convex surface facing toward the object, another (second) negative meniscus lens element having the convex surface facing toward the object, a negative lens element and a positive lens element which are cemented, in this order from the object.

If the second negative meniscus lens element is formed as a synthetic resin aspherical lens element, the correcting of distortion and astigmatism becomes possible.

Furthermore, by positioning the biconvex positive lens element at the most object-side of the wide-angle zoom lens system, distortion occurred in the second negative meniscus lens element which is made of synthetic resin can be corrected.

Since a lens element made of synthetic resin has poor durability, it is not preferable to provide such a lens element at the most object-side of the zoom lens system. Moreover, if the diameter of such a lens element becomes too large, the peripheral-edge thickness thereof becomes thicker. Consequently, fluctuations in aberration due to temperature changes become undesirably noticeable.

Therefore it is appropriate to form a relatively smaller diameter lens element as a synthetic resin lens element. If this is applied to the negative first lens group 10, the second negative meniscus lens element is suitable to be formed as a synthetic resign lens element. If the surface having a smaller curvature is made aspherical, the curvature at the periphery can be made larger. Consequently, the change in aberrations due to the temperature change can be made smaller.

The positive second lens group 20 can include positive cemented lens elements and a positive lens element, or two sets of positive cemented lens elements.

More specifically, the positive second lens group 20 can include a negative lens element and a positive lens element which are cemented, and a positive lens element, in this order from the object.

Alternatively, the positive second lens group 20 can include a negative lens element and a positive lens element which are cemented, and a positive lens element and a negative lens element which are cemented, in this order from the object.

A set of, or the two set of, the cemented lens elements can suitably correct spherical aberration and coma occurred in the positive second lens group 20.

The negative third lens group 30 can include two sets of negative cemented lens elements.

More specifically, the negative third lens group 30 can include a positive lens element and a negative lens element which are cemented, and a negative lens element and a positive lens element which are cemented, in this order from the object.

The two set of the cemented lens elements can suitably correct spherical aberration and chromatic aberration occurred in the negative third lens group 30.

The positive fourth lens group 40 can includes cemented lens elements and two positive lens elements, or two sets of cemented lens elements and a positive lens element.

More specifically, the positive fourth lens group 40 can include a positive lens element, a positive lens element and a negative lens element which are cemented, and a positive lens element, in this order from the object.

Alternatively, the positive fourth lens group 40 can include a positive lens element, a positive lens element and a negative lens element which are cemented, and a negative lens element and positive lens element which are cemented, in this order from the object.

As explained, the positive fourth lens group 40 can include the three positive lens elements.

Condition (7) specifies the Abbe number (Np1) of the most object-side positive lens element in the positive fourth lens group 40.

$$Np1>70 \quad (7)$$

The most object-side positive lens element more preferably satisfies the following condition:

$$Np1>80 \quad (7')$$

Condition (8) specifies the Abbe number (Np2) of the positive lens element provided in the middle of the positive fourth lens group 40.

$$Np2>65 \quad (8)$$

By satisfying conditions (7) and (8), the correcting of lateral chromatic aberration can be made adequately and easily.

If an attempt is made to provide a positive lens element on the image side of the middle positive lens element, and to adequately distribute positive power to the positive lens element (i.e., the most image-side positive lens element), the occurrence of spherical aberration and coma can be easily reduced.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and ν designates the Abbe number. The values for the distance "d" are indicated in the order of the short focal length extremity, an intermediate focal length and the long focal length extremity.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
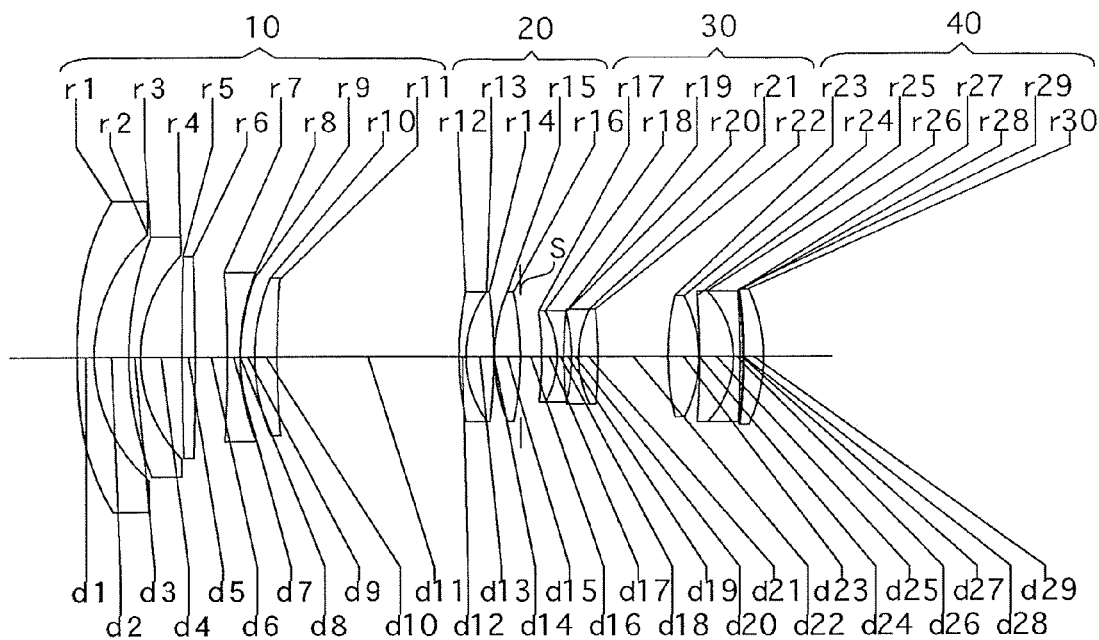
FIG. 1 is a lens arrangement of the wide-angle zoom lens system, at the short focal length extremity, according to a first embodiment of the present invention.
Figures 2A, 2B, 2C, 2D, 2E:
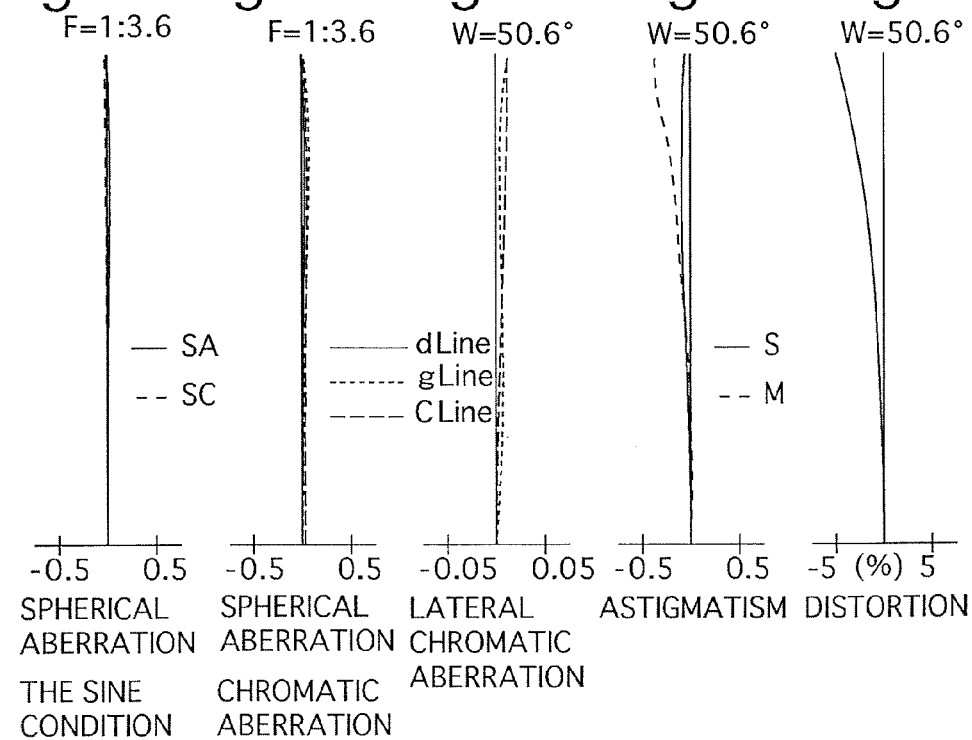
FIGS. 2A, 2B, 2C, 2D and 2E show aberrations occurred in the lens arrangement shown in FIG. 1.

FIG. 1 is the lens arrangement of the wide-angle zoom lens system, at the short focal length extremity, according to the first embodiment of the present invention. FIGS. 2A through 2E show aberrations occurred in the lens arrangement shown in FIG. 1.

Figure 3:
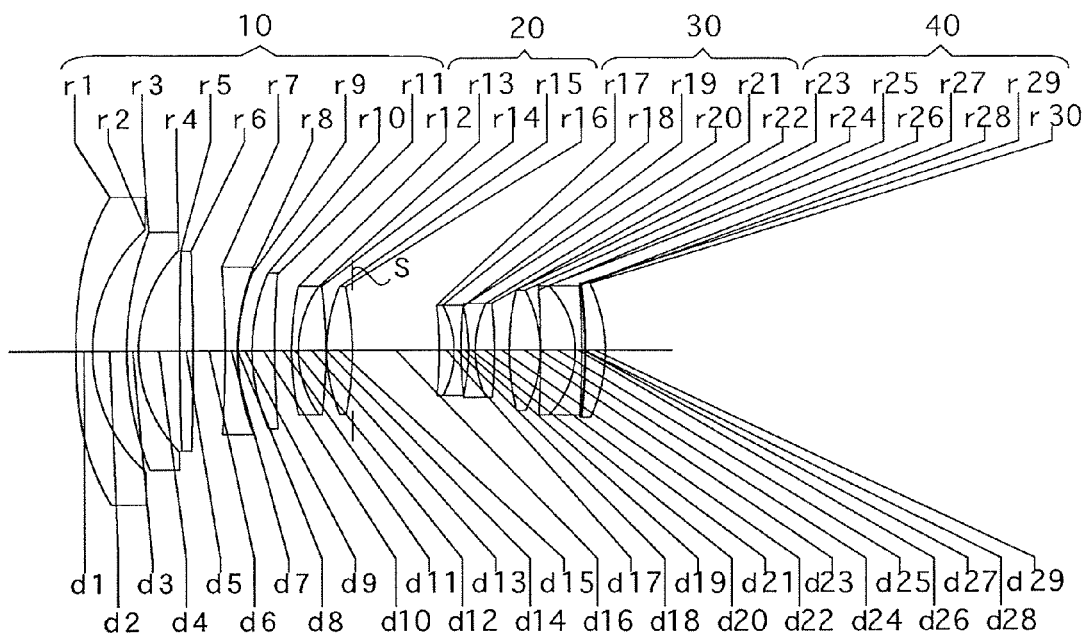
FIG. 3 is a lens arrangement of the wide-angle zoom lens system, at the long focal length extremity, according to the first embodiment of the present invention.
Figures 4A, 4B, 4C, 4D, 4E:
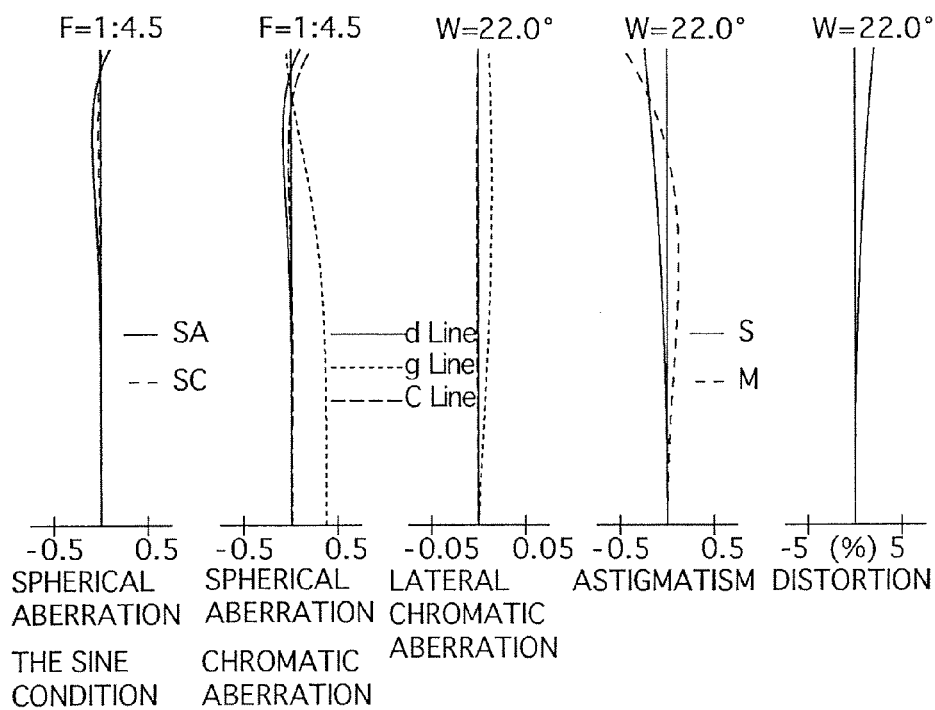
FIGS. 4A, 4B, 4C, 4D and 4E show aberrations occurred in the lens arrangement shown in FIG. 3.

FIG. 3 is the lens arrangement of the wide-angle zoom lens system, at the long focal length extremity, according to the first embodiment of the present invention. FIGS. 4A through 4E show aberrations occurred in the lens arrangement shown in FIG. 3.

Table 1 shows the numerical data of the first embodiment.

The wide-angle zoom lens system of the first embodiment includes a negative first lens group 10, a positive second lens group 20, a diaphragm S, a negative third lens group 30, and a positive fourth lens group 40, in this order from the object.

The negative first lens group 10 includes two negative meniscus lens elements each of which has the convex surface facing toward the object, a biconvex positive lens element, a biconcave negative lens element, and a positive lens element, in this order from the object. On the image-side surface of the biconcave negative lens element, an aspherical layer made of synthetic resin is formed.

The positive second lens group 20 includes a negative lens element and a positive lens element which are cemented, and a positive lens element, in this order from the object.

The negative third lens group 30 includes a positive lens element and a negative lens element which are cemented, and a negative lens element and a positive lens element which are cemented, in this order from the object.

The positive fourth lens group 40 includes a positive lens element, a positive lens element and a negative lens element which are cemented, and a positive lens element, in this order from the object. On the object-side surface of the most image-side positive lens element of the positive fourth lens group 40, an aspherical layer made of synthetic resign is formed.

The diaphragm S is provided 1.00 behind the positive second lens group 20 (surface No. 16).

TABLE 1

F = 1:3.6-4.0-4.5
f = 12.30-18.00-34.50
W = 50.6°-38.2°-22.0°
fB = 39.22-44.89-60.46

| Surf. No. | r | d | Nd | ν |
|---|---|---|---|---|
| 1* | 85.912 | 2.50 | 1.74320 | 49.3 |
| 2 | 24.220 | 5.11 | — | — |
| 3 | 48.112 | 1.70 | 1.72916 | 54.7 |
| 4 | 21.410 | 6.08 | — | — |
| 5 | 478.645 | 1.94 | 1.60000 | 38.5 |
| 6 | −478.645 | 4.72 | — | — |
| 7 | −164.558 | 1.80 | 1.80400 | 46.6 |
| 8 | 33.368 | 0.10 | 1.52972 | 42.7 |
| 9* | 33.368 | 2.05 | — | — |
| 10 | 29.351 | 3.29 | 1.56940 | 42.3 |
| 11 | 139.546 | 26.74-13.71-2.50 | — | — |
| 12 | 45.047 | 1.00 | 1.84666 | 23.8 |
| 13 | 15.951 | 4.14 | 1.55555 | 47.3 |
| 14 | −74.903 | 0.13 | — | — |
| 15 | 24.131 | 3.82 | 1.59016 | 39.5 |
| 16 | −45.596 | 3.14-6.11-13.01 | — | — |
| 17 | −56.686 | 2.23 | 1.80500 | 25.4 |
| 18 | −13.955 | 1.00 | 1.79904 | 40.6 |
| 19 | 63.472 | 1.15 | — | — |
| 20 | −28.212 | 1.00 | 1.80400 | 46.6 |
| 21 | 15.849 | 2.82 | 1.76588 | 26.8 |
| 22 | −68.953 | 10.21-8.22-2.20 | — | — |
| 23 | 37.898 | 4.55 | 1.49700 | 81.6 |
| 24 | −19.279 | 0.11 | — | — |
| 25 | −116.020 | 5.03 | 1.48749 | 70.2 |
| 26 | −13.720 | 1.00 | 1.80518 | 25.4 |
| 27 | −127.012 | 0.44 | — | — |
| 28* | −88.633 | 0.10 | 1.52972 | 42.7 |
| 29 | −88.633 | 2.92 | 1.48749 | 70.2 |
| 30 | −23.390 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 1 | 0.00 | $0.12372 \times 10^{-4}$ | $-0.14118 \times 10^{-7}$ |
| 9 | 0.00 | $0.11888 \times 10^{-4}$ | $-0.63772 \times 10^{-7}$ |
| 28 | 0.00 | $-0.22881 \times 10^{-4}$ | $-0.34462 \times 10^{-8}$ |

| Surf. No. | A8 | A10 |
|---|---|---|
| 1 | $0.14420 \times 10^{-10}$ | $-0.47374 \times 10^{-14}$ |
| 9 | $0.62109 \times 10^{-10}$ | $0.47949 \times 10^{-12}$ |
| 28 | $0.94666 \times 10^{-10}$ | |

Embodiment 2

FIG. 5 is the lens arrangement of the wide-angle zoom lens system, at the short focal length extremity, according to a second embodiment of the present invention. FIGS. 6A through 6E show aberrations occurred in the lens arrangement shown in FIG. 5.

Figure 7:
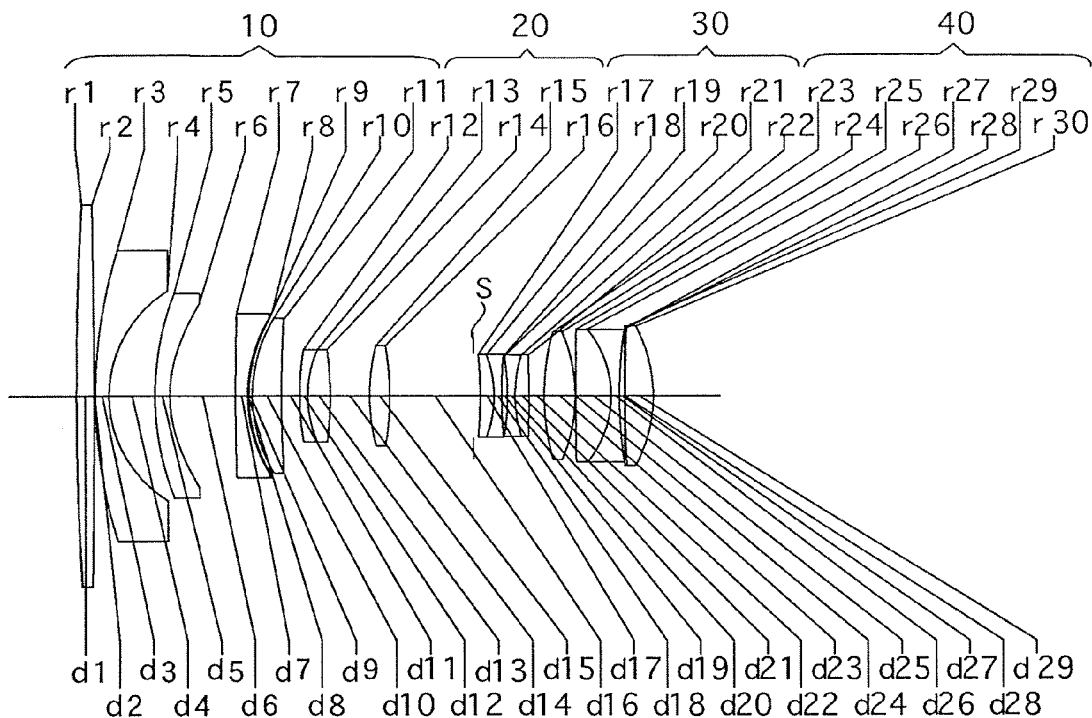
FIG. 7 is a lens arrangement of the wide-angle zoom lens system, at the long focal length extremity, according to the second embodiment of the present invention.
Figures 8A, 8B, 8C, 8D, 8E:
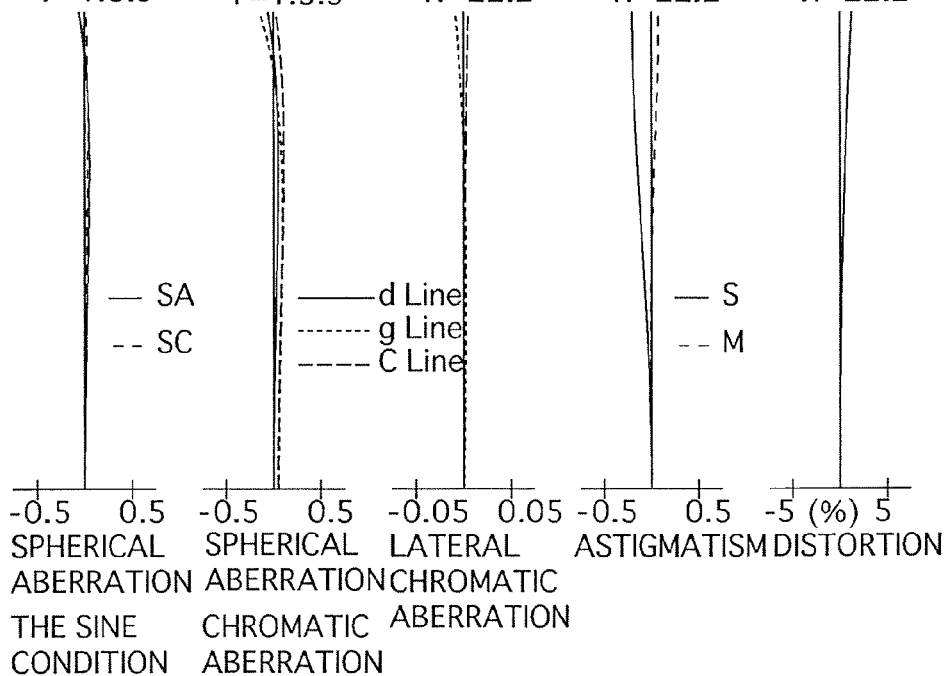
FIGS. 8A, 8B, 8C, 8D and 8E show aberrations occurred in the lens arrangement shown in FIG. 7.

FIG. 7 is the lens arrangement of the wide-angle zoom lens system, at the long focal length extremity, according to the second embodiment of the present invention. FIGS. 8A through 8E show aberrations occurred in the lens arrangement shown in FIG. 7.

Table 2 shows the numerical data of the second embodiment.

The negative first lens group 10 includes a biconvex positive lens element, two negative meniscus lens elements each of which has the convex surface facing toward the object, a negative lens element, and a positive lens element, in this order from the object. On the image-side surface of the negative lens element, an aspherical layer made of synthetic resign is formed.

The remaining lens arrangement is the same as that of the first embodiment.

The diaphragm S is provided 1.00 in front of the negative third lens group 30 (surface No. 17) on the optical axis.

TABLE 2

F = 1:3.6-4.0-5.9
f = 12.30-18.00-34.50
W = 50.6°-38.8°-22.2°
fB = 37.90-44.27-63.27

| Surf. No. | r | d | Nd | ν |
|---|---|---|---|---|
| 1 | 472.110 | 2.55 | 1.80500 | 39.1 |
| 2 | −1687.632 | 0.20 | — | — |
| 3 | 71.142 | 2.00 | 1.80400 | 46.6 |
| 4 | 18.101 | 6.76 | — | — |
| 5 | 40.578 | 2.20 | 1.52538 | 56.3 |
| 6* | 19.000 | 9.72 | — | — |
| 7 | 380.093 | 1.80 | 1.77250 | 49.9 |
| 8 | 21.914 | 0.20 | 1.52972 | 42.7 |
| 9* | 21.914 | 0.50 | — | — |
| 10 | 21.732 | 4.33 | 1.60100 | 37.9 |
| 11 | 188.578 | 28.88-15.13-2.74 | — | — |
| 12 | 40.496 | 1.20 | 1.84666 | 23.8 |
| 13 | 16.523 | 3.34 | 1.54256 | 46.7 |
| 14 | −53.591 | 5.83 | — | — |
| 15 | 29.502 | 2.98 | 1.55205 | 46.3 |
| 16 | −42.055 | 3.12-6.36-13.31 | — | — |
| 17 | −60.277 | 2.02 | 1.80518 | 25.4 |
| 18 | −16.901 | 1.10 | 1.80400 | 46.6 |
| 19 | 69.174 | 0.85 | — | — |
| 20 | −37.477 | 1.10 | 1.75695 | 42.2 |
| 21 | 19.810 | 2.06 | 1.80518 | 25.4 |
| 22 | −174.266 | 12.39-9.15-2.20 | — | — |
| 23 | 34.447 | 4.64 | 1.49700 | 81.6 |
| 24 | −23.203 | 0.10 | — | — |
| 25 | 726.371 | 5.25 | 1.48749 | 70.2 |
| 26 | −15.244 | 1.20 | 1.83500 | 29.1 |
| 27 | 69.568 | 0.74 | — | — |
| 28* | 190.169 | 0.10 | 1.52972 | 42.7 |
| 29 | 190.169 | 4.26 | 1.48749 | 70.2 |
| 30 | −21.270 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 6 | 0.00 | −0.34238 × 10$^{-4}$ | −0.71547 × 10$^{-8}$ | −0.10324 × 10$^{-9}$ |
| 9 | 0.00 | −0.77559 × 10$^{-6}$ | −0.45921 × 10$^{-7}$ | 0.24198 × 10$^{-10}$ |
| 28 | 0.00 | −0.23297 × 10$^{-4}$ | 0.19028 × 10$^{-8}$ | 0.14837 × 10$^{-9}$ |

Embodiment 3

Figure 9:
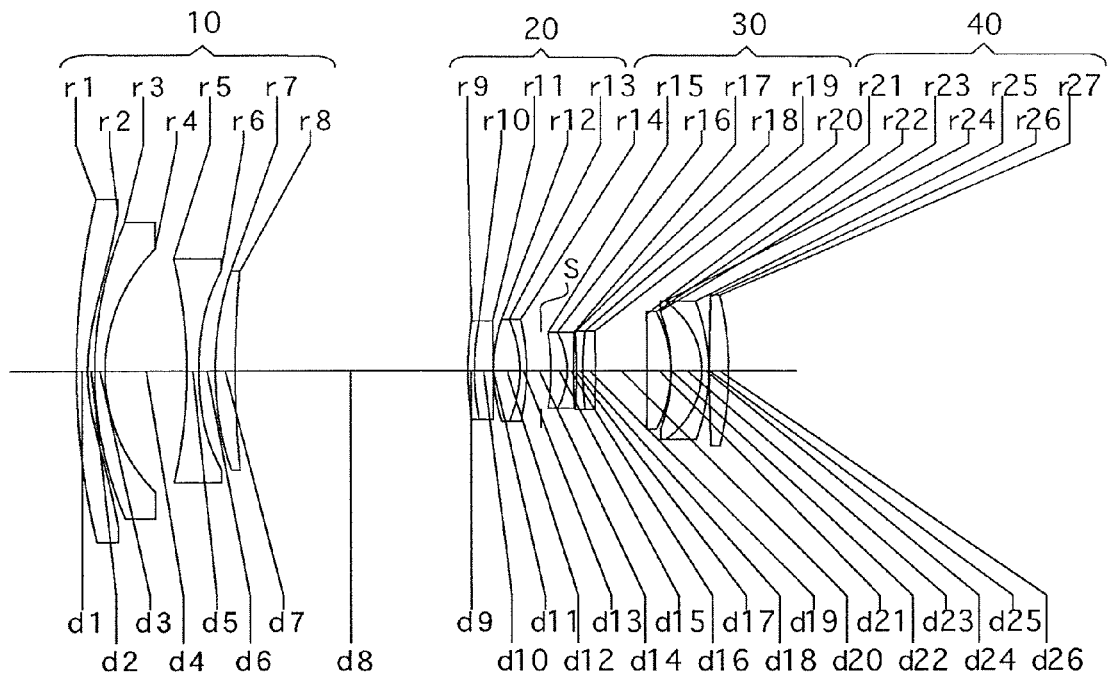
FIG. 9 is a lens arrangement of the wide-angle zoom lens system, at the short focal length extremity, according to a third embodiment of the present invention.
Figures 10A, 10B, 10C, 10D, 10E:
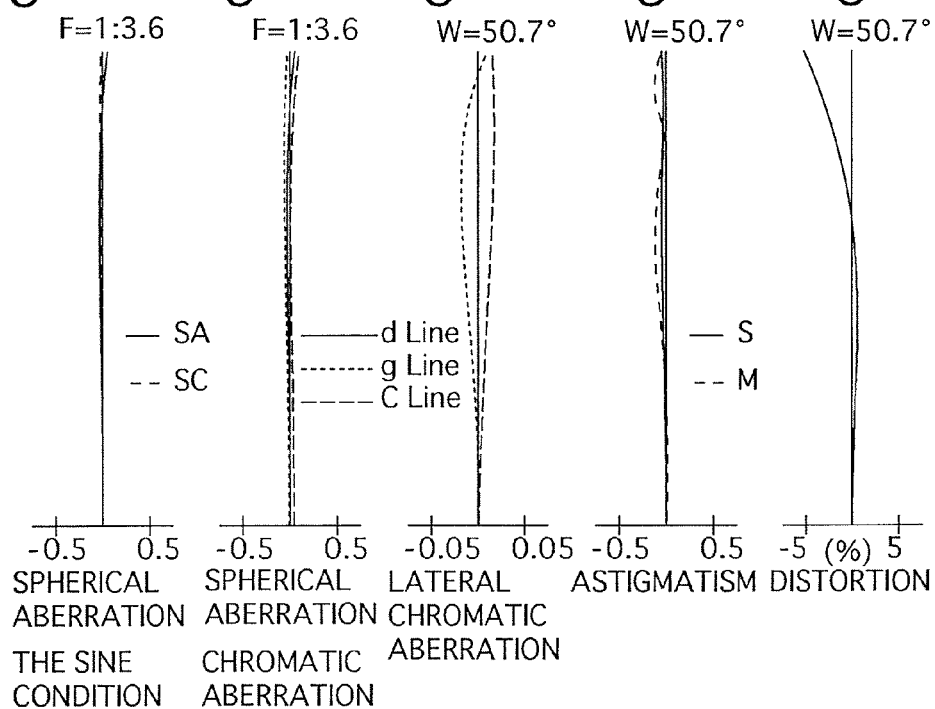
FIGS. 10A, 10B, 10C, 10D and 10E show aberrations occurred in the lens arrangement shown in FIG. 9.

FIG. 9 is the lens arrangement of the wide-angle zoom lens system, at the short focal length extremity, according to the third embodiment of the present invention. FIGS. 10A through 10E show aberrations occurred in the lens arrangement shown in FIG. 9.

FIG. 11 is the lens arrangement of the wide-angle zoom lens system, at the long focal length extremity, according to the third embodiment of the present invention. FIGS. 12A through 12E show aberrations occurred in the lens arrangement shown in FIG. 11.

Table 3 shows the numerical data of the third embodiment.

The wide-angle zoom lens system of the third embodiment includes a negative first lens group 10, a positive second lens group 20, a diaphragm S, a negative third lens group 30, and a positive fourth lens group 40, in this order from the object.

The negative first lens group 10 includes two negative meniscus lens elements each of which has the convex surface facing toward the object, a biconcave negative lens element, and a positive lens element, in this order from the object.

The positive second lens group 20 includes a negative lens element and a positive lens element which are cemented, and a positive lens element and a negative lens element which are cemented, in this order from the object.

The negative third lens group 30 includes a positive lens element and a negative lens element which are cemented, and a negative lens element and a positive lens element which are cemented, in this order from the object.

The positive fourth lens group 40 includes a positive lens element, a positive lens element and a negative lens element which are cemented, and a positive lens element, in this order from the object.

The diaphragm S is provided 1.50 in front of the negative third lens group 30 (surface No. 15) on the optical axis.

TABLE 3

F = 1:3.6-4.1-4.6
f = 12.30-20.00-34.66
W = 50.7°-35.2°-21.9°
fB = 37.90-45.76-57.89

| Surf. No. | r | d | Nd | ν |
|---|---|---|---|---|
| 1 | 108.265 | 1.70 | 1.80400 | 46.6 |
| 2* | 30.165 | 1.03 | — | — |
| 3 | 55.670 | 1.50 | 1.71741 | 54.4 |
| 4 | 25.427 | 12.23 | — | — |
| 5 | −70.612 | 1.80 | 1.67536 | 57.1 |
| 6* | 48.166 | 2.43 | — | — |
| 7 | 46.386 | 3.00 | 1.84697 | 23.9 |
| 8 | 159.463 | 34.57-13.91-2.50 | — | — |
| 9 | 46.552 | 1.00 | 1.80518 | 25.4 |
| 10 | 38.847 | 2.72 | 1.48757 | 70.3 |
| 11 | −21079.764 | 0.10 | — | — |
| 12 | 24.607 | 3.95 | 1.51610 | 63.2 |
| 13 | −18.496 | 1.00 | 1.80500 | 33.3 |
| 14 | −33.133 | 3.70-8.01-17.83 | — | — |
| 15 | −33.406 | 2.40 | 1.84691 | 23.8 |
| 16 | −11.731 | 1.00 | 1.79706 | 44.0 |
| 17 | 397.757 | 0.39 | — | — |
| 18 | −105.116 | 1.00 | 1.80400 | 46.6 |
| 19 | 52.163 | 1.90 | 1.54642 | 46.3 |
| 20 | −250.221 | 7.70-6.93-2.20 | — | — |
| 21 | −541.821 | 3.53 | 1.56907 | 71.3 |
| 22 | −18.581 | 0.10 | — | — |
| 23 | −23.884 | 4.48 | 1.48749 | 70.2 |
| 24 | −12.445 | 1.00 | 1.80518 | 25.4 |

TABLE 3-continued

F = 1:3.6-4.1-4.6
f = 12.30-20.00-34.66
W = 50.7°-35.2°-21.9°
fB = 37.90-45.76-57.89

| Surf. No. | r | d | Nd | ν |
|---|---|---|---|---|
| 25 | −28.671 | 0.10 | — | — |
| 26* | 231.912 | 2.88 | 1.75001 | 52.9 |
| 27 | −46.797 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 2 | 0.00 | $-0.30737 \times 10^{-4}$ | $0.24909 \times 10^{-7}$ |
| 6 | 0.00 | $0.32117 \times 10^{-4}$ | $-0.59408 \times 10^{-6}$ |
| 26 | 0.00 | $-0.27122 \times 10^{-5}$ | $0.17648 \times 10^{-8}$ |

| Surf. No. | A8 | A10 |
|---|---|---|
| 2 | $-0.14887 \times 10^{-10}$ | $-0.25869 \times 10^{-14}$ |
| 6 | $0.11958 \times 10^{-9}$ | $-0.23576 \times 10^{-12}$ |
| 26 | $0.22312 \times 10^{-10}$ | |

Embodiment 4

Figure 13:
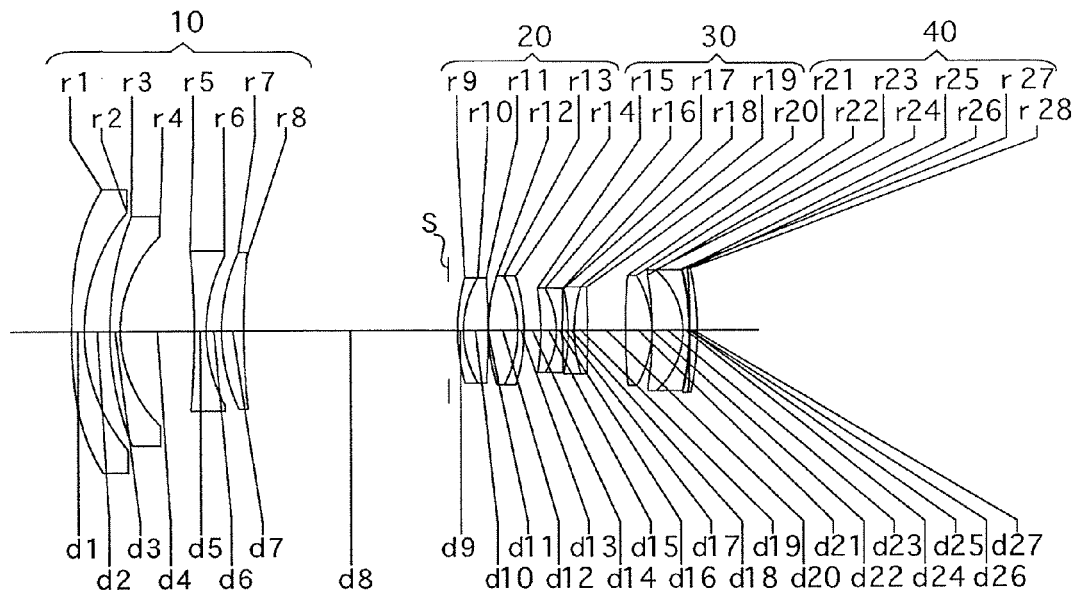
FIG. 13 is a lens arrangement of the wide-angle zoom lens system, at the short focal length extremity, according to a fourth embodiment of the present invention.
Figures 14A, 14B, 14C, 14D, 14E:
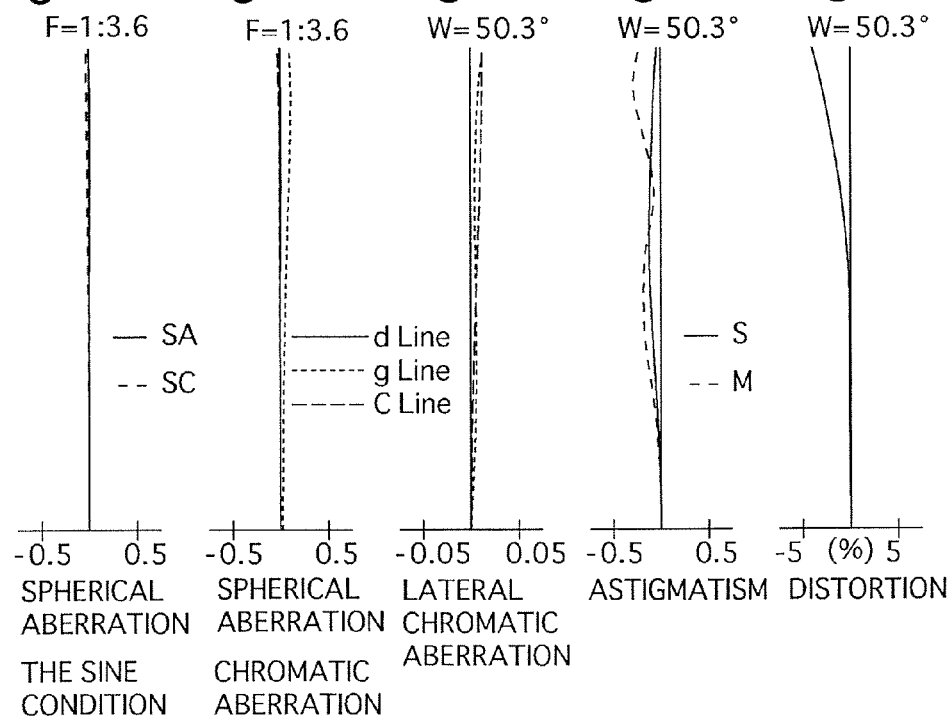

FIG. 13 is the lens arrangement of the wide-angle zoom lens system, at the short focal length extremity, according to a fourth embodiment of the present invention. FIGS. 14A through 14E show aberrations occurred in the lens arrangement shown in FIG. 13.

FIG. 15 is the lens arrangement of the wide-angle zoom lens system, at the long focal length extremity, according to the fourth embodiment of the present invention. FIGS. 16A through 16E show aberrations occurred in the lens arrangement shown in FIG. 15.

Table 4 shows the numerical data of the fourth embodiment.

The wide-angle zoom lens system of the first embodiment includes a negative first lens group 10, a diaphragm S, a positive second lens group 20, a negative third lens group 30, and a positive fourth lens group 40, in this order from the object.

The positive fourth lens group 40 includes a positive lens element, a positive lens element and a negative lens element which are cemented, and a positive lens element which are cemented, in this order from the object. On the object-side surface of the most image-side positive lens element, an aspherical layer made of synthetic resign is formed.

The remaining lens arrangement is the same as that of the third embodiment.

The diaphragm S is provided 1.44 in front of the positive second lens group 20 (surface No. 9) on the optical axis.

TABLE 4

F = 1:3.6-4.1-4.6
f = 12.30-20.00-34.50
W = 50.3°-35.2°-22.1°
fB = 37.90-46.92-63.61

| Surf. No. | r | d | Nd | ν |
|---|---|---|---|---|
| 1* | 117.127 | 2.10 | 1.77250 | 49.6 |
| 2 | 29.886 | 4.14 | — | — |
| 3 | 50.059 | 1.70 | 1.73126 | 53.0 |
| 4 | 21.410 | 12.11 | — | — |
| 5 | −135.838 | 1.95 | 1.74534 | 53.0 |
| 6* | 27.089 | 2.49 | — | — |
| 7 | 29.994 | 3.64 | 1.82555 | 24.6 |
| 8 | 120.872 | 34.72-15.57-3.94 | — | — |
| 9 | 29.694 | 1.00 | 1.80518 | 25.4 |
| 10 | 16.604 | 3.96 | 1.52367 | 49.8 |
| 11 | −141.762 | 0.10 | — | — |
| 12 | 27.470 | 4.90 | 1.49700 | 81.6 |
| 13 | −18.337 | 1.00 | 1.80040 | 42.2 |
| 14 | −29.306 | 2.75-5.97-11.25 | — | — |
| 15 | −44.364 | 2.53 | 1.84666 | 23.8 |
| 16 | −13.710 | 1.00 | 1.81674 | 38.0 |
| 17 | 438.367 | 0.93 | — | — |
| 18 | −34.805 | 1.00 | 1.80400 | 46.6 |
| 19 | 23.818 | 2.20 | 1.80518 | 25.4 |
| 20 | −194.537 | 6.09-5.20-2.20 | — | — |
| 21 | 97.963 | 4.33 | 1.49700 | 81.6 |
| 22 | −17.216 | 0.10 | — | — |
| 23 | −53.058 | 5.03 | 1.48749 | 70.2 |
| 24 | −12.949 | 1.00 | 1.80518 | 25.4 |
| 25 | −41.506 | 0.10 | — | — |
| 26* | −292.968 | 0.10 | 1.52972 | 42.7 |
| 27 | −39.180 | 1.12 | 1.48749 | 70.2 |
| 28 | −46.990 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 1 | 0.00 | $0.16314 \times 10^{-4}$ | $-0.23372 \times 10^{-7}$ |
| 6 | 0.00 | $0.15008 \times 10^{-4}$ | $-0.39560 \times 10^{-7}$ |
| 26 | 0.00 | $-0.12831 \times 10^{-4}$ | $-0.18041 \times 10^{-7}$ |

| Surf. No. | A8 | A10 |
|---|---|---|
| 1 | $0.28111 \times 10^{-10}$ | $-0.12557 \times 10^{-13}$ |
| 6 | $-0.44122 \times 10^{-10}$ | $0.42243 \times 10^{-12}$ |
| 26 | $0.14011 \times 10^{-9}$ | |

Embodiment 5

Figure 17:
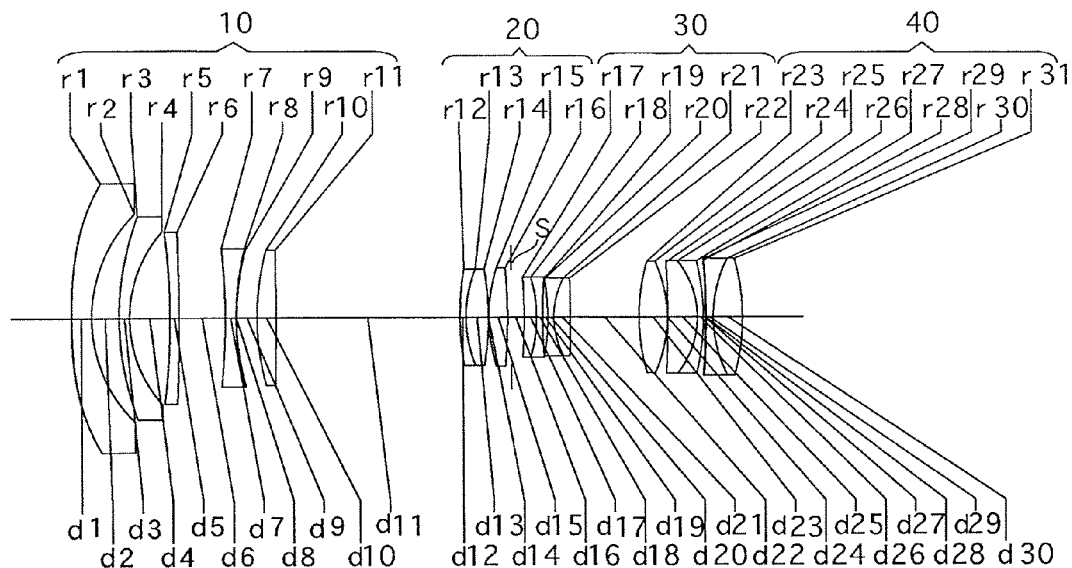
FIG. 17 is a lens arrangement of the wide-angle zoom lens system, at the short focal length extremity, according to a fifth embodiment of the present invention.
Figures 18A, 18B, 18C, 18D, 18E:
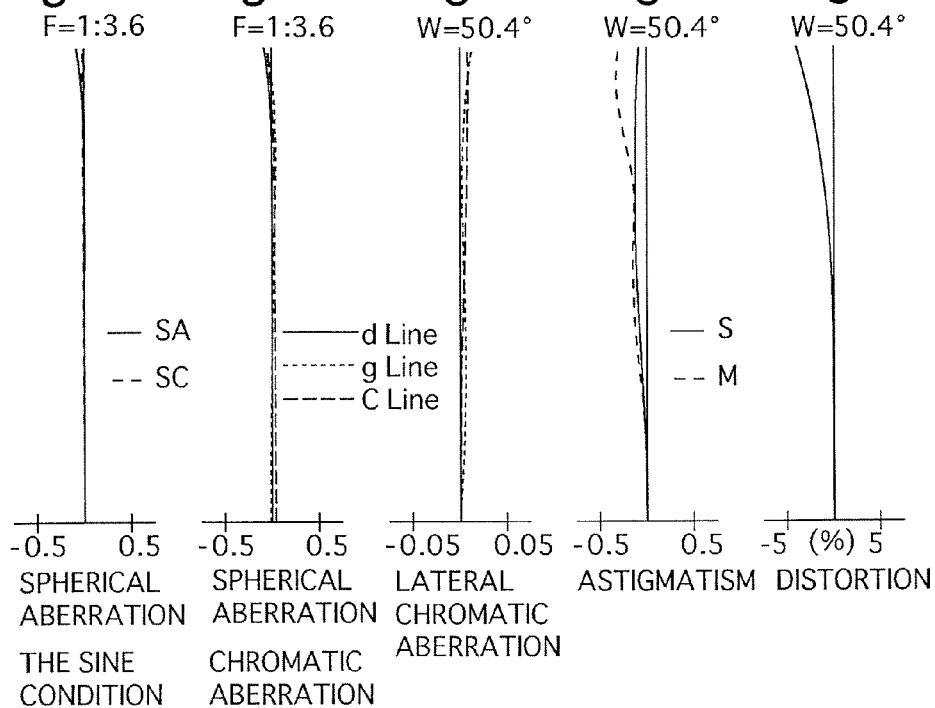
FIGS. 18A, 18B, 18C, 18D and 18E show aberrations occurred in the lens arrangement shown in FIG. 17.

FIG. 17 is the lens arrangement of the wide-angle zoom lens system, at the short focal length extremity, according to the fifth embodiment of the present invention. FIGS. 18A through 18E show aberrations occurred in the lens arrangement shown in FIG. 17.

FIG. 19 is the lens arrangement of the wide-angle zoom lens system, at the long focal length extremity, according to the fifth embodiment of the present invention. FIGS. 20A through 20E show aberrations occurred in the lens arrangement shown in FIG. 19.

Table 5 shows the numerical data of the fifth embodiment.

The negative first lens group 10 includes two negative meniscus lens elements each of which has the convex surface facing toward the object, a negative meniscus lens element having the convex surface facing toward the image, a biconcave negative lens element, and a positive lens element, in this order from the object. On the image-side surface of the biconcave negative lens element, an aspherical layer made of synthetic resin is formed.

The positive fourth lens group 40 includes a positive lens element, a positive lens element and a negative lens element which are cemented, and a negative lens element and a positive lens element which are cemented, in this order from the object. On the most object-side surface of the image-side cemented lens elements, an aspherical layer made of synthetic resign is formed.

The remaining lens arrangement is the same as that of the first embodiment.

The diaphragm S is provided 0.57 behind the positive second lens group 20 (surface No. 16) on the optical axis.

TABLE 5

F = 1:3.6-4.0-5.7
f = 12.26-17.96-34.36
W = 50.4°-38.1°-22.1°
fB = 38.26-44.23-62.46

| Surf. No. | r | d | Nd | ν |
|---|---|---|---|---|
| 1* | 91.308 | 3.30 | 1.77250 | 49.6 |
| 2 | 24.186 | 4.55 | — | — |
| 3 | 47.162 | 1.70 | 1.72916 | 54.7 |
| 4 | 21.410 | 6.69 | — | — |
| 5 | −111.822 | 1.50 | 1.80500 | 41.0 |
| 6 | −360.039 | 7.62 | — | — |
| 7 | −107.920 | 1.80 | 1.80400 | 46.6 |
| 8 | 46.561 | 0.10 | 1.52972 | 42.7 |
| 9* | 46.561 | 3.39 | — | — |
| 10 | 42.070 | 3.12 | 1.65012 | 33.8 |
| 11 | −910.711 | 30.56-15.95-2.50 | — | — |
| 12 | 46.942 | 1.00 | 1.84666 | 23.8 |
| 13 | 21.143 | 3.68 | 1.51700 | 52.8 |
| 14 | −46.935 | 0.10 | — | — |
| 15 | 27.005 | 3.06 | 1.55779 | 45.8 |
| 16 | −85.366 | 2.77-5.90-12.43 | — | — |
| 17 | −87.582 | 2.02 | 1.80500 | 25.1 |
| 18 | −23.350 | 1.00 | 1.80400 | 46.6 |
| 19 | 108.766 | 0.81 | — | — |
| 20 | −40.143 | 1.00 | 1.80499 | 46.8 |
| 21 | 13.963 | 2.70 | 1.76978 | 32.1 |
| 22 | −213.856 | 11.50-8.62-2.10 | — | — |
| 23 | 32.590 | 4.70 | 1.49700 | 81.6 |
| 24 | −21.790 | 0.10 | — | — |
| 25 | −151.933 | 4.89 | 1.49700 | 81.6 |
| 26 | −14.615 | 1.00 | 1.80500 | 33.8 |
| 27 | −38.844 | 0.40 | — | — |
| 28* | −131.487 | 0.10 | 1.52972 | 42.7 |
| 29 | −131.487 | 1.20 | 1.83400 | 37.2 |
| 30 | 21.131 | 4.83 | 1.48749 | 70.2 |
| 31 | −35.810 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 1 | 0.00 | $0.13779 \times 10^{-4}$ | $-0.18080 \times 10^{-7}$ |
| 9 | 0.00 | $0.12062 \times 10^{-4}$ | $-0.24889 \times 10^{-7}$ |
| 28 | 0.00 | $-0.17035 \times 10^{-4}$ | $-0.13130 \times 10^{-7}$ |

| Surf. No. | A8 | A10 |
|---|---|---|
| 1 | $0.22254 \times 10^{-10}$ | $-0.10645 \times 10^{-13}$ |
| 9 | $-0.21219 \times 10^{-9}$ | $0.10481 \times 10^{-11}$ |
| 28 | $0.33070 \times 10^{-9}$ | |

Embodiment 6

FIG. 21 is the lens arrangement of the wide-angle zoom lens system, at the short focal length extremity, according to a sixth embodiment of the present invention. FIGS. 22A through 22E show aberrations occurred in the lens arrangement shown in FIG. 21.

FIG. 23 is the lens arrangement of the wide-angle zoom lens system, at the long focal length extremity, according to the sixth embodiment of the present invention. FIGS. 24A through 24E show aberrations occurred in the lens arrangement shown in FIG. 23.

Table 6 shows the numerical data of the sixth embodiment.

The negative first lens group 10 includes two negative meniscus lens elements each of which has the convex surface facing toward the object, a positive lens element and a negative lens element which are cemented, and a positive lens element, in this order from the object.

The positive fourth lens group 40 includes a positive lens element, a positive lens element and a negative lens element which are cemented, and a positive lens element, in this order from the object. On the object-side surface of the most image-side positive lens element, an aspherical layer made of synthetic resign is formed.

The remaining lens arrangement is the same as that of the fourth embodiment.

The diaphragm S is provided 1.49 in front of the positive second lens group 20 (surface No. 10).

TABLE 6

F = 1:3.6-4.1-4.6
f = 12.30-20.00-34.50
W = 50.3°-35.3°-22.1°
fB = 37.90-46.58-61.62

| Surf. No. | r | d | Nd | ν |
|---|---|---|---|---|
| 1* | 102.190 | 2.10 | 1.77250 | 49.6 |
| 2 | 27.981 | 5.77 | — | — |
| 3 | 73.019 | 1.70 | 1.63369 | 61.1 |
| 4 | 21.410 | 9.09 | — | — |
| 5 | 8824.983 | 2.09 | 1.78385 | 33.9 |
| 6 | −102.798 | 1.90 | 1.72900 | 54.9 |
| 7* | 35.805 | 2.93 | — | — |
| 8 | 40.321 | 2.72 | 1.80518 | 25.4 |
| 9 | 103.837 | 34.77-15.44-3.99 | — | — |
| 10 | 37.851 | 1.00 | 1.80518 | 25.4 |
| 11 | 20.378 | 3.27 | 1.53586 | 46.7 |
| 12 | −176.055 | 0.62 | — | — |
| 13 | 24.445 | 5.09 | 1.49700 | 81.6 |
| 14 | −16.937 | 1.00 | 1.77334 | 44.4 |
| 15 | −29.477 | 2.74-6.13-12.28 | — | — |
| 16 | −41.709 | 2.53 | 1.84666 | 23.8 |
| 17 | −12.933 | 1.00 | 1.80094 | 36.7 |
| 18 | 193.766 | 0.91 | — | — |
| 19 | −37.151 | 1.00 | 1.80400 | 46.6 |
| 20 | 19.508 | 2.32 | 1.80518 | 25.4 |
| 21 | −331.192 | 6.73-5.34-2.20 | — | — |
| 22 | 48.506 | 4.53 | 1.49700 | 81.6 |
| 23 | −18.483 | 0.10 | — | — |
| 24 | −60.036 | 4.94 | 1.48749 | 70.2 |
| 25 | −13.314 | 1.00 | 1.80518 | 25.4 |
| 26 | −39.403 | 0.10 | — | — |
| 27* | −240.114 | 0.10 | 1.52972 | 42.7 |
| 28 | −240.114 | 2.03 | 1.48749 | 70.2 |
| 29 | −54.185 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 1 | 0.00 | $0.13782 \times 10^{-4}$ | $-0.19168 \times 10^{-7}$ |
| 7 | 0.00 | $0.79751 \times 10^{-5}$ | $-0.41761 \times 10^{-7}$ |
| 27 | 0.00 | $-0.16112 \times 10^{-4}$ | $-0.22033 \times 10^{-7}$ |

| Surf. No. | A8 | A10 |
|---|---|---|
| 1 | $0.22444 \times 10^{-10}$ | $-0.10758 \times 10^{-13}$ |
| 7 | $0.38509 \times 10^{-10}$ | $0.28352 \times 10^{-13}$ |
| 27 | $0.15801 \times 10^{-9}$ | |

The numerical values of each condition for each embodiment are shown in Table 7.

TABLE 7

| | Embod. 1 | Embod. 2 | Embod. 3 |
|---|---|---|---|
| Condition (1) | 1.38 | 1.30 | 1.69 |
| Condition (2) | 2.57 | 3.02 | 2.67 |
| Condition (3) | 0.66 | 0.71 | 0.78 |
| Condition (4) | 0.63 | 0.75 | 0.85 |
| Condition (5) | 1.34 | 1.53 | 1.30 |
| Condition (6) | 1.46 | 1.43 | 1.12 |

| | Embod. 4 | Embod. 5 | Embod. 6 |
|---|---|---|---|
| Condition (1) | 1.47 | 1.35 | 1.53 |
| Condition (2) | 2.87 | 3.22 | 2.61 |
| Condition (3) | 0.72 | 0.73 | 0.74 |
| Condition (4) | 0.76 | 0.81 | 0.71 |
| Condition (5) | 1.38 | 1.52 | 1.36 |
| Condition (6) | 1.35 | 1.42 | 1.32 |

As can be understood from Table 7, the first through sixth embodiments satisfy conditions (1) through (6). Furthermore, as can be understood from the aberration diagrams, the various aberrations are adequately corrected.

According to the above description, a wide-angle zoom lens system having the following features can be obtained:

(i) being suitable for a digital SLR camera having a smaller imaging device;

(ii) the angle-of-view of approximately 100 degrees at the short focal length extremity; and (iii) a zoom ratio of approximately 2.5 through 3.0.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle zoom lens system comprises a negative first lens group, a positive second lens group, a negative third lens group and a positive fourth lens group, in this order from an object;

wherein upon zooming from the short focal length extremity to the long focal length extremity, a distance between said negative first lens group and said positive second lens group decreases, a distance between said positive second lens group and said negative third lens group increases, and a distance between said negative third lens group and said positive fourth lens group decreases;

wherein said wide-angle zoom lens system satisfies the following conditions:

$$1.3 < |f1|/fw < 1.7 \ (f1 < 0)$$

$$2.5 < f4/fw < 3.3$$

wherein f1 designates the focal length of said negative first lens group;

f4 designates the focal length of said positive fourth lens group; and fw designates the focal length of the entire wide-angle zoom lens system at the short focal length extremity.

2. The wide-angle zoom lens system according to claim 1, further satisfying the following condition:

$$0.6 < f2/ft < 0.8$$

wherein f2 designates the focal length of said positive second lens group; and ft designates the focal length of the entire wide-angle zoom lens system at the long focal length extremity.

3. The wide-angle zoom lens system according to claim 1, further satisfying the following condition:

$$0.4 < |f3|/ft < 0.9 \ (f3 < 0)$$

wherein f3 designates the focal length of said negative third lens group; and ft designates the focal length of the entire wide-angle zoom lens system at the long focal length extremity.

4. The wide-angle zoom lens system according to claim 1, wherein said negative first lens group comprises, at least, a negative meniscus lens element having the convex surface facing toward the object, another negative meniscus lens element having the convex surface facing toward the object, a negative lens element having a concave surface facing toward the image, and a positive lens element, in this order from the object.

5. The wide-angle zoom lens system according to claim 1, wherein said positive second lens group comprises positive cemented lens elements and a positive lens element, or two sets of positive cemented lens elements.

6. The wide-angle zoom lens system according to claim 1, wherein said negative third lens group comprises two sets of negative cemented lens elements.

7. The wide-angle zoom lens system according to claim 1, wherein said positive fourth lens group comprises cemented lens elements and two positive lens elements, or two sets of cemented lens elements and a positive lens element.

8. A wide-angle zoom lens system comprises a negative first lens group, a positive second lens group, a negative third lens group and a positive fourth lens group, in this order from an object;

wherein upon zooming from the short focal length extremity to the long focal length extremity, a distance between said negative first lens group and said positive second lens group decreases, a distance between said positive second lens group and said negative third lens group increases, and a distance between said negative third lens group and said positive fourth lens group decreases;

wherein said wide-angle zoom lens system satisfies the following conditions:

$$0.6 < f2/ft < 0.8$$

$$0.4 < |f3|/ft < 0.9 \ (f3 < 0)$$

wherein f2 designates the focal length of said positive second lens group;

f3 designates the focal length of said negative third lens group; and ft designates the focal length of the entire wide-angle zoom lens system at the long focal length extremity.

9. The wide-angle zoom lens system according to claim 8, further satisfying the following condition:

$$2.5 < f4/fw < 3.3$$

wherein f4 designates the focal length of said positive fourth lens group; and fw designates the focal length of the entire wide-angle zoom lens system at the short focal length extremity.

10. The wide-angle zoom lens system according to claim 8, further satisfying the following conditions:

$$1.2 < f2/|f1| < 1.6 \ (f1 < 0)$$

$$1.2 < f4/|f3| < 1.6 \ (f3 < 0)$$

wherein f1 designates the focal length of said negative first lens group;

f2 designates the focal length of said positive second lens group;

f3 designates the focal length of said negative third lens group; and f4 designates the focal length of said positive fourth lens group.

11. The wide-angle zoom lens system according to claim 8, wherein said negative first lens group comprises, at least, a negative meniscus lens element having the convex surface facing toward the object, another negative meniscus lens element having the convex surface facing toward the object, a negative lens element having a concave surface facing toward the image, and a positive lens element, in this order from the object.

12. The wide-angle zoom lens system according to claim 8, wherein said positive second lens group comprises positive cemented lens elements and a positive lens element, or two sets of positive cemented lens elements.

13. The wide-angle zoom lens system according to claim 8, wherein said negative third lens group comprises two sets of negative cemented lens elements.

14. The wide-angle zoom lens system according to claim 8, wherein said positive fourth lens group comprises cemented lens elements and two positive lens elements, or two sets of cemented lens elements and a positive lens element.

15. A wide-angle zoom lens system comprises a negative first lens group, a positive second lens group, a negative third lens group and a positive fourth lens group, in this order from an object;

wherein upon zooming from the short focal length extremity to the long focal length extremity, a distance between said negative first lens group and said positive second lens group decreases, a distance between said positive second lens group and said negative third lens group increases, and a distance between said negative third lens group and said positive fourth lens group decreases;

wherein said wide-angle zoom lens system satisfies the following conditions:

$$1.2 < f2/|f1| < 1.6 \ (f1 < 0)$$

$$1.2 < f4/|f3| < 1.6 \ (f3 < 0)$$

wherein f1 designates the focal length of said negative first lens group;

f2 designates the focal length of said positive second lens group;

f3 designates the focal length of said negative third lens group; and f4 designates the focal length of said positive fourth lens group.

16. The wide-angle zoom lens system according to claim 15, wherein said negative first lens group comprises, at least, a negative meniscus lens element having the convex surface facing toward the object, another negative meniscus lens element having the convex surface facing toward the object, a negative lens element having a concave surface facing toward the image, and a positive lens element, in this order from the object.

17. The wide-angle zoom lens system according to claim 15, wherein said positive second lens group comprises positive cemented lens elements and a positive lens element, or two sets of positive cemented lens elements.

18. The wide-angle zoom lens system according to claim 15, wherein said negative third lens group comprises two sets of negative cemented lens elements.

19. The wide-angle zoom lens system according to claim 15, wherein said positive fourth lens group comprises cemented lens elements and two positive lens elements, or two sets of cemented lens elements and a positive lens element.

* * * * *